(12) United States Patent
Benthien et al.

(10) Patent No.: US 10,533,597 B2
(45) Date of Patent: Jan. 14, 2020

(54) FIXATION ASSEMBLY FOR AFFIXING A FIRST OBJECT TO AND VARIABLY SPACED FROM A SECOND OBJECT

(71) Applicant: Airbus Operations GmbH, Hamburg (DE)

(72) Inventors: Hermann Benthien, Hamburg (DE); Michael Telkamp, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 161 days.

(21) Appl. No.: 15/614,679

(22) Filed: Jun. 6, 2017

(65) Prior Publication Data

US 2017/0350437 A1   Dec. 7, 2017

(30) Foreign Application Priority Data

Jun. 6, 2016  (EP) .................................. 16173169

(51) Int. Cl.
*F16B 37/08*   (2006.01)
*F16B 5/02*    (2006.01)
(Continued)

(52) U.S. Cl.
CPC .......... *F16B 37/085* (2013.01); *F16B 5/0233* (2013.01); *F16B 39/12* (2013.01);
(Continued)

(58) Field of Classification Search
CPC ....... F16B 5/0233; F16B 21/02; F16B 37/085
(Continued)

(56) References Cited

U.S. PATENT DOCUMENTS 1,438,312 A    12/1922   Kerwin
1,451,970 A *   4/1923   Taylor ................... B25B 31/005
                                              411/418
(Continued)

FOREIGN PATENT DOCUMENTS

DE         20117485      4/2002
DE       102010038040    4/2012
(Continued)

OTHER PUBLICATIONS

European Examination Report for corresponding European Patent Application No. 16173150.0.
European Search Report, dated Nov. 16, 2016, priority document.

*Primary Examiner* — Flemming Saether
(74) *Attorney, Agent, or Firm* — Greer, Burns & Crain, Ltd.

(57) ABSTRACT

A fixation assembly for affixing a first object to and variably spaced from a second object. The assembly comprises a male fastener and a female fastener. The male fastener comprises a bolt-shaped part having a circumferential outer surface. The surface includes alternately on a circumferential path, in a cross-sectional plane of the part, at least one ridged section and at least one plain section. The female fastener comprises a tubular part having a circumferential inner surface. The inner surface includes alternately on a circumferential path, in a cross-sectional plane of the part, at least one ridged section and at least one plain section. The male fastener can be inserted into the female fastener such that its ridged section coincides with the female fastener plain section. Either the male or female fastener is configured to be rotated relative to the other, thereby engaging respective ridges of the two fasteners.

9 Claims, 16 Drawing Sheets

(51) Int. Cl.
*F16B 39/12* (2006.01)
*B64F 5/10* (2017.01)
*B64C 1/06* (2006.01)
*B64D 11/00* (2006.01)

(52) U.S. Cl.
CPC ...... *B64C 1/066* (2013.01); *B64D 2011/0046* (2013.01); *B64F 5/10* (2017.01); *F16B 5/0275* (2013.01)

(58) Field of Classification Search
USPC ................. 411/418, 437, 349, 549–551, 553
See application file for complete search history.

(56) References Cited

U.S. PATENT DOCUMENTS

| | | | |
|---|---|---|---|
| 1,469,131 A | | 9/1923 | Whiteside |
| 1,571,037 A | | 1/1926 | Bartlett et al. |
| 2,167,176 A | * | 7/1939 | Grassberger .......... E04B 1/4121 411/182 |
| 2,730,154 A | * | 1/1956 | Aspey .................... F16B 39/32 411/321 |
| 2,742,073 A | | 4/1956 | Iannetti |
| 3,720,430 A | * | 3/1973 | St. Paul .................... F16B 7/10 403/118 |
| 4,637,175 A | | 1/1987 | Froening et al. |
| 5,881,979 A | * | 3/1999 | Rozier, Jr. ........... A47B 91/024 248/188.4 |
| 6,088,878 A | * | 7/2000 | Antonucci ............... E05F 5/022 16/86 A |
| 6,817,810 B2 | * | 11/2004 | Jones ...................... E02D 5/523 405/230 |
| 8,382,415 B1 | * | 2/2013 | Goldbaum ............ F16B 39/122 411/366.1 |
| 8,616,819 B1 | * | 12/2013 | Koster .................... F16B 21/02 411/418 |
| 8,979,417 B2 | * | 3/2015 | Wandelt ................. F16B 5/025 403/350 |
| 9,580,951 B2 | * | 2/2017 | Duprez .................. E05F 5/022 |

FOREIGN PATENT DOCUMENTS

| | | |
|---|---|---|
| FR | 365212 | 9/1906 |
| GB | 193736 | 3/1923 |
| GB | 2123057 | 1/1984 |
| WO | 2006102729 | 10/2006 |
| WO | 2009080001 | 4/2009 |
| WO | 2014088600 | 6/2014 |
| WO | 2014088600 A1 | 6/2014 |

\* cited by examiner

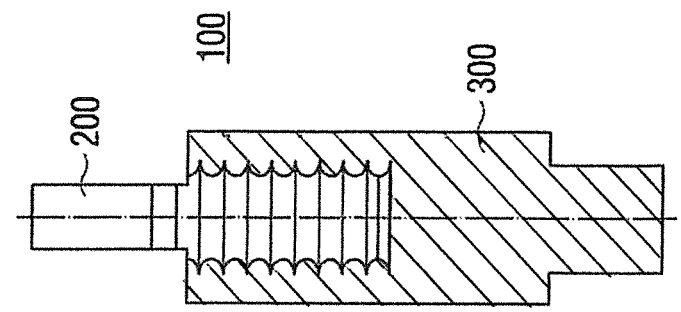
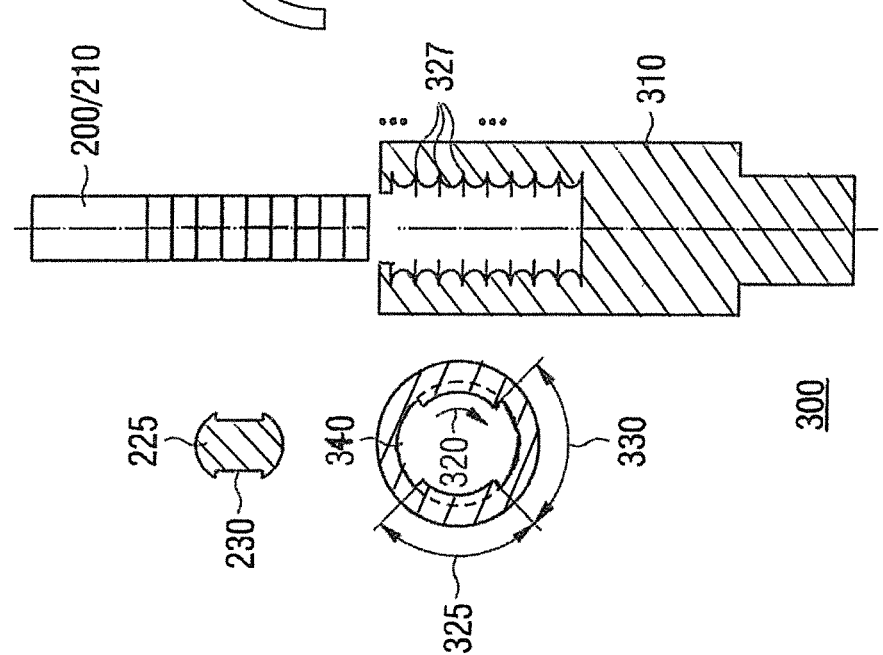
FIG 2

FIG 7
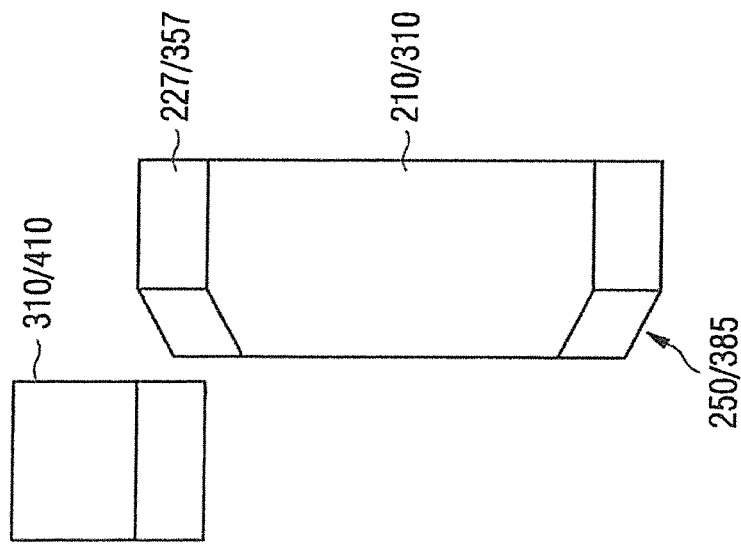
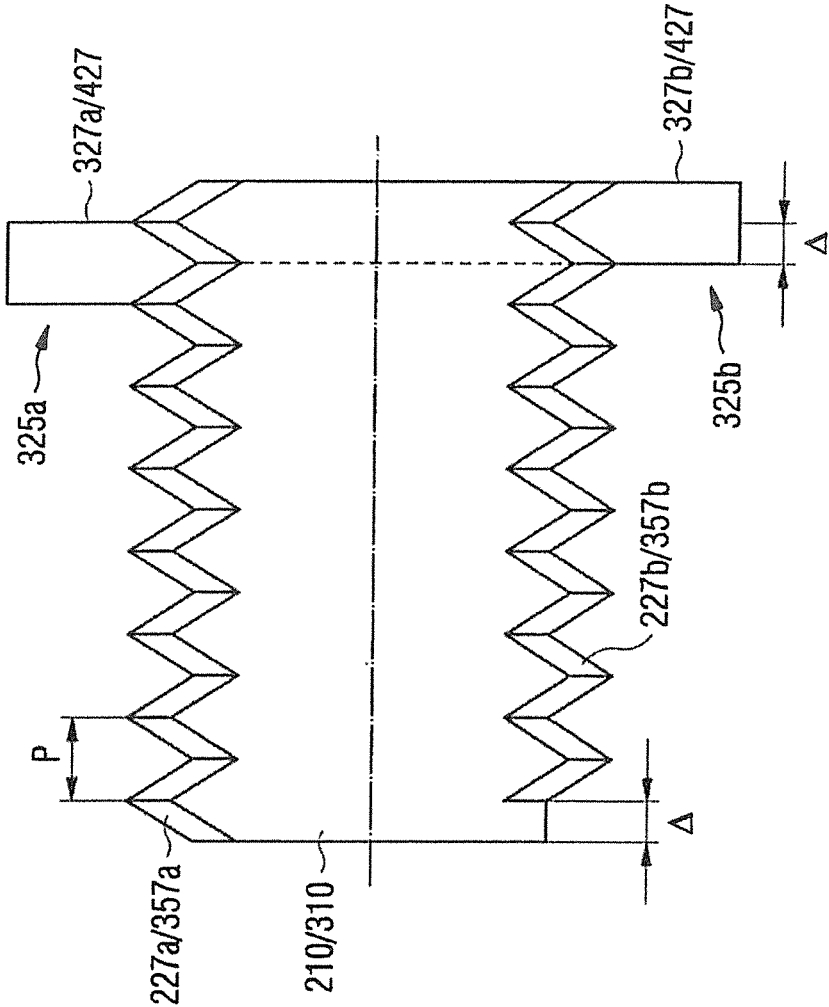

FIG 11
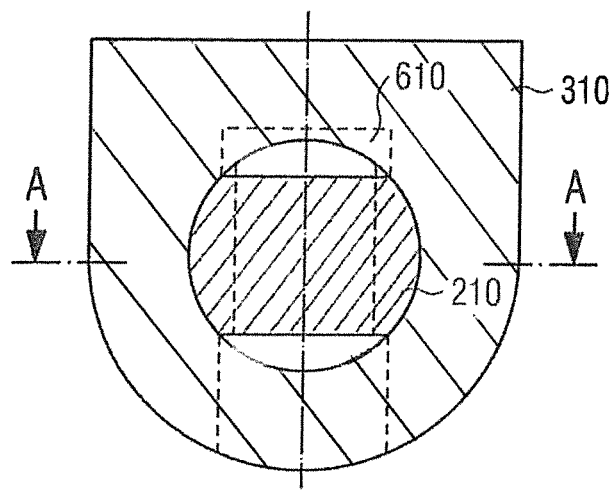
Section A-A
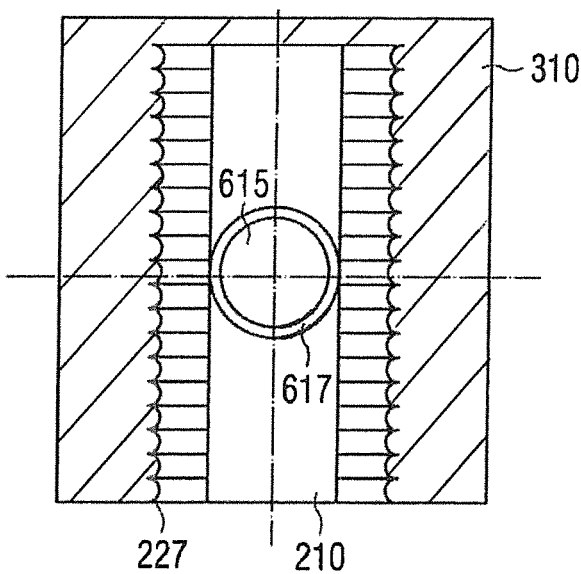

FIG 12
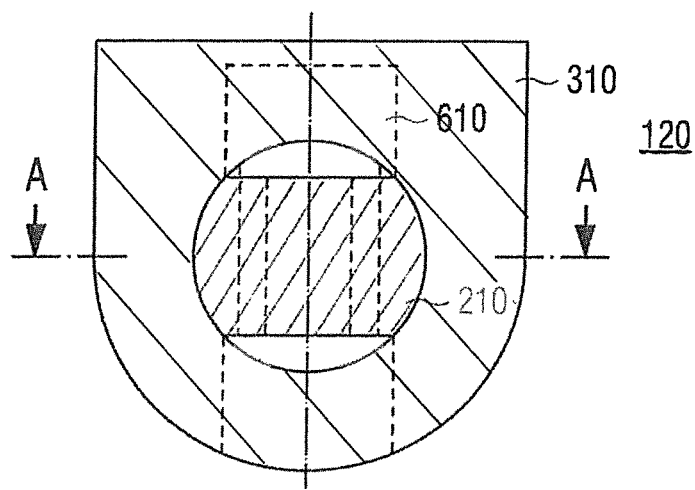
Section A-A
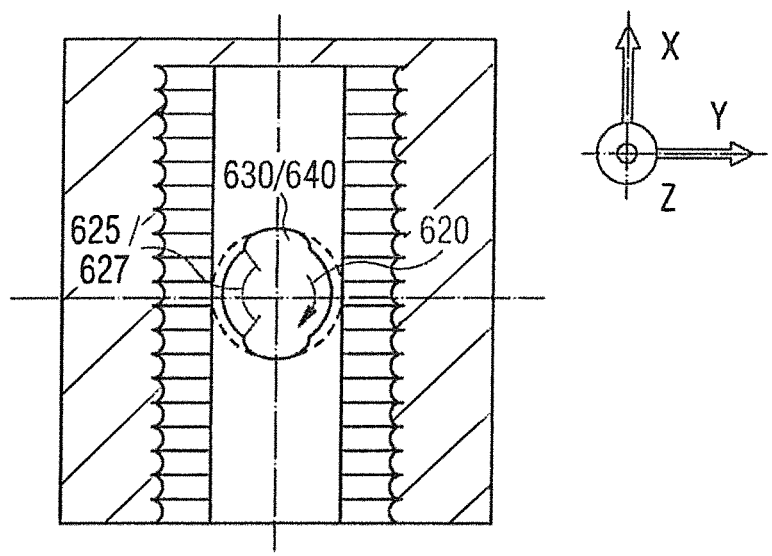

FIXATION ASSEMBLY FOR AFFIXING A FIRST OBJECT TO AND VARIABLY SPACED FROM A SECOND OBJECT

CROSS-REFERENCES TO RELATED APPLICATIONS

This application claims the benefit of the European patent application No. 16173169.0 filed on Jun. 6, 2016, the entire disclosures of which are incorporated herein by way of reference.

BACKGROUND OF THE INVENTION

The present invention relates to a fixation assembly for affixing a first object to a second object, and in particular for affixing the first object variably spaced from the second object.

The fixation of an object relative to another object is conventionally achieved by a threaded rod affixed to one object and a washer and nut coupled to the other object. In order to provide a particular distance between the objects, one or more spacers are employed.

However, when installing a plurality of objects along a line, each of the objects has to be affixed with a respective spacer. If a certain tolerance is further to be levelled out, different spacers have to be used for each object. The installation of such a plurality of objects, therefore, becomes cumbersome and time-consuming.

For instance, in a passenger cabin of an aircraft the ceiling above passenger seats may comprise a plurality of different panels, including panels with reading lights, control buttons, security signs and covers for oxygen mask containers. Likewise, a plurality of modules including such panels may be installed when building the interior of the aircraft. Each of these modules or other components having one or more panels to form the ceiling of the passenger cabin is affixed to the primary structure, such as a former, or an installation bar provided on the primary structure. In the longitudinal direction of the aircraft the height of the primary structure or installation bar in relation to a floor of the passenger cabin may vary due to tolerances or other measures affecting the distance between the cabin floor and the primary structure above the cabin floor. Thus, if the modules or components having the panels would be installed to the primary structure or installation bar with the same fixation structure, the panels may be installed at different heights, i.e., different distances to the cabin floor. Such fixation of the panels is undesirable, since passengers and aircraft operators prefer a flush ceiling. The use of different sized spacers, on the other hand, is time-consuming, since the correct spacer has to be found during installation and installed for each module or panel.

SUMMARY OF THE INVENTION

Thus, it is an object of the present invention to provide a fixation assembly for affixing a first object to and variably spaced from a second object, which can be installed in an easy and fast manner.

According to an aspect, a fixation assembly for affixing a first object to and variably spaced from a second object comprises a first male fastener and a first female fastener. In order to affix the first object to the second object, the first object is coupled to, for example, the first male fastener and the second object is coupled to, for example, the first female fastener. It is to be understood that the first object may also be coupled to the first female fastener, while the second object may be coupled to the first male fastener.

The first male fastener comprises a bolt-shaped part having a circumferential outer surface, wherein the circumferential outer surface includes alternately on a circumferential path in a cross-sectional plane of the bolt-shaped part at least one ridged section and at least one plain section, wherein each ridged section includes at least one ridge. The circumferential path is the intersecting line of the outer surface of the bolt-shaped part and a cross section of the bolt-shaped part. Thus, when following the outer surface of the bolt-shaped part on the circumferential path, a ridged section is followed by a plain section. More than one ridged section can be present, so that when following the circumferential path completely around the outer surface, a ridged section is followed by a plain section followed by another ridged section, etc.

In case the bolt-shaped part has a circular cross-section, each of the ridged sections and the plain sections corresponds to a circular arc or segment of a circle. The at least one ridge of the ridged section(s) extends over the circular arc, i.e., has the same length (measured along the circumferential path) as the circular arc.

The bolt-shaped part can have a different cross-sectional shape, such as an ellipse or a rectangle having two opposite curved sides. The ridged section(s) can be arranged at any segment of their circumferential outer surface disrupted by and the plain section(s).

Furthermore, the first female fastener comprises a tubular part having a circumferential inner surface, wherein the circumferential inner surface includes alternately on a circumferential path in a cross-sectional plane of the tubular part at least one ridged section and at least one plain section, wherein each ridged section includes at least one ridge. As for the first male fastener, the circumferential path is the intersecting line of the inner surface of the tubular part and a cross section of the tubular part. Thus, when following the inner surface of the tubular part on the circumferential path, a ridged section is followed by a plain section. More than one ridged section can be present, so that when following the circumferential path completely around the inner surface, a ridged section is followed by a plain section followed by another ridged section, etc.

The tubular part of the first female fastener may have a circular cross-section, so that each of the ridged section and the plain section corresponds to a circular arc or segment of a circle. The at least one ridge of the ridged section(s) extends over the circular arc, i.e., has the same length as the circular arc.

As with the first male fastener, the cross-sectional shape of the tubular part can be a different form other than a circle, for example, an ellipse or a rectangle having two opposite curved sides.

Furthermore, the first male fastener is configured to be inserted into the first female fastener in a state where a cross-sectional projection of the at least one ridged section of the first male fastener coincides with a cross-sectional projection of the at least one plain section of the first female fastener. In other words, the cross-sectional projection of the bolt-shaped part of the first male fastener including the ridged section(s) does not overlap with a cross-sectional projection of the interior opening of the tubular part. This allows easily inserting the bolt-shaped part of the first male fastener into the tubular part of the first female fastener.

One of the first male fastener and the first female fastener can be rotated relative to the other fastener, thereby engaging respective ridges of the first male fastener and the first female fastener. When inserted, each ridged section of the first male fastener is located in a corresponding plain section of the first female fastener and, hence, next to a ridged section of the first female fastener. When performing a rotation of either the first male fastener or the first female fastener, the ridge(s) of the first male fastener engages with the ridge(s) of the first female fastener. Thus, a cross-sectional projection of the ridge(s) of the first male fastener overlaps with a cross-sectional projection of the ridge(s) of the first female fastener. In other words, the ridge(s) of the first male fastener extend in a cross-sectional plane as far as a bottom or valley of the ridge(s) of the first female fastener. The cross-sectional extent, of course, includes a tolerance allowing relative rotation of the ridge(s) of the first male and first female fasteners.

When engaged, the ridges of both fasteners affix the fasteners to one another and, hence, the first object to the second object. In other words, the engaged ridges of both fasteners prevent withdrawing of the first male fastener from the first female fastener.

Depending on the number of ridges arranged on the bolt-shaped part of the first male fastener and/or arranged on the tubular part of the first female fastener in a longitudinal direction of the respective fastener, the first male fastener can be affixed to the first female fastener at any desired insertion depth. For instance, if a plurality of ridges is arranged in the longitudinal direction of the bolt-shaped part and/or the tubular part, the first male fastener can be affixed to the first female fastener as soon as a first ridge of the first male fastener can engage with a first ridge of the first female fastener. In other words, in the moment the first male fastener has been inserted into first female fastener in as much that one ridge of the first male fastener has passed one ridge of the first female fastener, an engagement of the two ridges is possible and both fasteners can be affixed to each other. Thus, having a plurality of ridges at at least one of the fasteners provides for affixing one fastener (object) to and variably spaced from another fastener (object).

The rotation angle for a full engagement of the ridges of the first male and female fasteners depends on the number and/or arc length of the ridged sections of the first male and female fasteners. For instance, only one ridged section may be present at the first male and female fasteners, which occupies a quarter or a half of the circumferential path of the outer and inner surface of the first male fastener and the first female fastener, respectively. Thus, at least a quarter or half turn of one of the fasteners is required for a full engagement of the ridges.

It is to be understood that the ridged sections can have any desired size along the outer/inner surface of the first male/female fastener. In case the first male and female fasteners have ridges of equal size, their respective length is limited to half the length of the circumferential path of the outer/inner surface, i.e., 180° in case of a circular cross-section. Otherwise, the cross-sectional projection of ridged section(s) would overlap and the first male fastener could not be inserted into the first female fastener. Ridges of equal size and taking up half the length of the circumferential path at the first male and first female fasteners provides for the maximum load transmission between male and female fasteners. The ridged sections can be distributed around the complete circumferential path and summing up to half the length of the circumferential path, which allows a better distributed, but still maximum, load transmission.

Moreover, the size of a ridged section of one of the fasteners may be different from the size of a ridged section of the other fastener (size refers to a length along the circumferential path). For instance, while the first female fastener has one ridged section occupying (almost) three quarter of the inner surface of its tubular part, the first male fastener can have one ridged section occupying (almost) one quarter of the outer surface of its bolt-shaped part. Thus, an insertion of the two fasteners into each other is still possible, while an engagement is possible over three quarter of the inner surface of the female fastener. This provides for a secure engagement and fixation.

The above outlined sizes of the ridge(s) do not limit the present disclosure. Rather, the ridge(s) of the male and female fasteners can have any size (length along the respective circumferential path), as long as their cross-sectional projections do not overlap during insertion.

Furthermore, at least one of the plain sections of at least one of the bolt-shaped part of the first male fastener and the tubular part of the first female fastener can include a recess. The cross-sectional size of such recess can be slightly larger than the cross-sectional size of a corresponding ridged section of the other fastener. This provides for an easy insertion, since a small tilting of one of the fasteners does not lead to a blocking of the two fasteners before full insertion.

According to one implementation, the at least one ridge of the ridged section of the first male fastener and the at least one ridge of the ridge section of the first female fastener may have a pitch value of zero. Thus, the ridges of the ridged sections of both fasteners may be in a plane parallel to a cross-sectional plane of the bolt-shaped part and the tubular part of the respective fasteners.

According to another implementation, the at least one ridge of the ridged section of the first male fastener and the at least one ridge of the ridged section of the first female fastener may have a pitch value greater than zero. In other words, each of the ridged sections can form a thread, i.e., a segment of a thread discontinued by the plain section(s). With a pitch value greater than zero a fixation of the two fasteners (objects) is possible at any desirable distance. When rotating one of the fasteners, corresponding ridged sections start engaging, and when continuing rotating, the extent of insertion of the first male fastener into the first female fastener increases due to the positive pitch value. It is to be understood, that a negative pitch value is also possible. In this case the engaging of corresponding ridged sections would provide for affixing both fasteners (objects) and depending on the extent of rotation would further provide for moving the first male fastener out of the tubular section of the first female fastener. Thus, depending on the pitch value any desired distance between two objects can be achieved when affixed to one another with such fixation assembly. Ridges of equal size and taking up half the length of the circumferential path at the first male and first female fasteners provide for maximum utilization of the positive or negative pitch value (does not equal zero), since they allow the maximum degree of rotation. Thus, a fine granular adjustment of the distance between the two fasteners can be achieved.

According to a further variation of the fixation assembly, the bolt-shaped part of the first male fastener can include at least two ridged sections on the circumferential path in the cross-sectional plane of the bolt-shaped part, wherein the at least one ridge of a first ridged section can be located differently in a longitudinal direction of the bolt-shaped part than the at least one ridge of a second ridged section. In other words, when following the outer surface of the bolt-shaped part along the circumferential path, a first ridged section is followed by a plain section, followed by the second ridged section and followed by a further plain section. It is to be understood that even more than two ridged sections can be arranged on the bolt-shaped part. The ridge(s) of a first ridged section may lie in a plane parallel to a cross-sectional plane of the bolt-shaped part, while the ridge(s) of a second ridged section may lie in a different plane also parallel to the cross-sectional plane of the bolt-shaped part and at a distance to the plane of the ridge(s) of the first ridged section. Thus, there is an offset between the planes, in which the ridges of the first ridged section and the second ridged section are arranged.

The tubular part of the first female fastener can then include one ridged section on the circumferential path in the cross-sectional plane of the tubular part. The size of this ridged section of the tubular part corresponds to at least one of the plain sections of the bolt-shaped part of the first male fastener. This allows for an engagement of the ridges of the first male fastener and first female fastener at different levels of insertion of the first male fastener into the first female fastener. Depending on the offset between the ridges of the two ridged sections of the first male fastener a fixation between the fasteners (objects) can be achieved with a fine granularity. It is advantageous, if the offset is smaller than the distance between two adjacent ridges, since an engagement of the ridges at insertion levels of the fasteners being smaller than the distance between two adjacent ridges can be achieved.

According to another arrangement, the tubular part of the first female fastener can include at least two ridged sections, where the ridge(s) of a first ridged section have an offset in the longitudinal direction of the tubular part to the ridge(s) of a second ridged section. The first male fastener having only one ridged section then allows an engagement of corresponding ridges of the first male fastener and first female fastener at a fine granularity, i.e., at smaller insertion levels than the pitch of the ridges.

In both cases of an offset, the ridges of the first male and the first female fasteners can also have a pitch value that does not equal zero. This combination of offset of respective ridges and inclination of the ridges in the longitudinal direction of the fastener provides for a very fine granular adjustment of the distance between the two fasteners.

According to a further aspect, the fixation assembly can further comprise a second female fastener. This second female fastener may comprise a tubular part having a circumferential inner surface, wherein the circumferential inner surface includes alternately on a circumferential path in a cross-sectional plane of the tubular part at least one ridged section and at least one plain section, wherein each ridged section includes at least one ridge. The structure of the second female fastener can be identical or similar to that of the first female fastener. Furthermore, the above variants described for the first female fastener are also applicable to the second female fastener. However, the cross-sectional shape of the tubular part of the second female fastener is larger than the cross-sectional shape of the tubular part of the first female fastener.

In addition, the first female fastener can be a connecting bush and the tubular part of the first female fastener may have a circumferential outer surface including alternately on the circumferential path in the cross-sectional plane of the tubular part at least one ridged section and at least one plain section, and wherein each ridged section includes at least one ridge. Thus, the first female fastener can have a circumferential outer surface structured similar or identical to that of the first male fastener. However, the length of the circumferential path on the circumferential outer surface of the tubular part of the first female fastener is larger than the length of the circumferential path on the circumferential outer surface of the bolt-shaped part of the first male fastener. Again, the above variants described for the first male fastener are also applicable to the outer surface of the first female fastener, when the latter is forming a connecting bush.

The first female fastener can be inserted into the second female fastener in a state where a cross-sectional projection of the at least one ridged section of the first female fastener coincides with a cross-sectional projection of the at least one plain section of the second female fastener. In other words, the cross-sectional projection of the tubular part of the first female fastener including the ridged section(s) on the circumferential outer surface does not overlap with a cross-sectional projection of the interior opening of the tubular part of the second female fastener. This allows easily inserting the first female fastener into the tubular part of the second female fastener.

Furthermore, the first female fastener can be rotated relative to the first male fastener and relative to the second female fastener, thereby engaging respective ridges of the circumferential outer surface of the first female fastener and ridges of the circumferential inner surface of the second female fastener and engaging respective ridges of the circumferential inner surface of the first female fastener and ridges of the circumferential outer surface of the first male fastener. Thus, while the first male fastener and the second female fastener can have fixed positions, the first female fastener is moved into a space between the bolt-shaped part of the first male fastener and the tubular part of the second female fastener. Subsequently, the first female fastener can be rotated in order to affix all three fasteners with one another.

In a variant, the first female fastener can comprise a countersunk head. Such countersunk head can correspond to a countersink of the second female fastener or the second object attached to the second female fastener. Furthermore, the countersunk head can engage with the countersink and thereby affix the second female fastener and/or the second object.

According to a further variant, the first female fastener may comprise at at least one longitudinal end of the tubular part attachment means configured to receive a tool for rotating the first female fastener. For instance, the first female fastener may be configured to be inserted fully into a space between the first male fastener and the second female fastener. When applying a tool to the attachment means, the first female fastener may be rotated with the tool. For example, the attachment means may include a nut-shaped tubular form or two or more holes provided in a front face of the tubular part of the first female fastener.

In accordance with yet a further aspect, the first male fastener may further comprise a bore in the bolt-shaped part substantially perpendicular to a longitudinal axis of the bolt-shaped part, the bore having a circumferential inner surface. For instance, the bore may extend between two opposite plain sections of the bolt-shaped part of the first male fastener. A fixation between the first male fastener and the first female fastener with the above-described varying degree of insertion can be achieved, while the bore can be used for attachment of another component.

For example, the circumferential inner surface of the bore may be provided with a helical thread. This allows attaching any component to the first male fastener by using a screw screwed into the thread in the bore.

According to a variant, the circumferential inner surface of the bore includes alternately on a circumferential path in a cross-sectional plane of the bore at least one ridged section and at least one plain section, wherein each ridged section includes at least one ridge. In other words, the circumferential inner surface of the bore may be configured in the same manner as the circumferential inner surface of the first female fastener. All above variants and implementations of the first female fastener are applicable to the circumferential inner surface of the bore.

Furthermore, the fixation assembly may further comprise a second male fastener comprising a bolt-shaped part having a circumferential outer surface, wherein the circumferential outer surface of the bolt-shaped part of the second male fastener includes alternately on a circumferential path in a cross-sectional plane of the bolt-shaped part of the second male fastener at least one ridged section and at least one plain section, wherein each ridged section includes at least one ridge. The circumferential outer surface of the second male fastener can be configured in the same manner as the circumferential outer surface of the first male fastener. All above variants and implementations of the first male fastener are applicable to the circumferential outer surface of the second male fastener.

In one implementation, the second male fastener can be inserted into the bore of the first male fastener in a state where a cross-sectional projection of the at least one ridged section of the second male fastener coincides with a cross-sectional projection of the at least one plain section of the bore of the first male fastener. Thus, the cross-sectional projection of the bolt-shaped part of the second male fastener including the ridged section(s) does not overlap with a cross-sectional projection of the interior opening of the bore of the first male fastener. This provides for an easy insertion of the second male fastener into the bore of the first male fastener.

Furthermore, the second male fastener may be rotated relative to the first male fastener, thereby engaging respective ridges of the second male fastener and the bore of the first male fastener. Thus, as with the first male fastener and the first female fastener, the second male fastener can be affixed to the bore of the first male fastener. If the bore of the first male fastener is substantially perpendicular to a longitudinal direction of the bolt-shaped part of the first male fastener, two objects can be affixed to one another with variable distances in two directions. A first variably spaced fixation can be achieved with the first male fastener and the first female fastener, while a second variably spaced fixation in a substantially perpendicular direction can be achieved with the second male fastener inserted and rotated in the bore of the first male fastener.

According to another variant, the fixation assembly may further comprise a third female fastener coupled to the second male fastener and comprising a tubular part having a circumferential inner surface, wherein the circumferential inner surface of the third female fastener includes alternately on a circumferential path in a cross-sectional plane of the tubular part of the third female fastener at least one ridged section and at least one plain section, wherein each ridged section includes at least one ridge. Again, the circumferential inner surface of the third female fastener may have the same properties as the circumferential inner surface of the first female fastener. All above variants and implementations of the first female fastener are applicable to the third female fastener.

According to an implementation, the third female fastener can be put onto a further male fastener in a state where a cross-sectional projection of the at least one ridged section of the third female fastener coincides with a cross-sectional projection of at least one plain section of the further male fastener. The further male fastener may be structured in the same manner as, for example, the first male fastener. Furthermore, the third female fastener can be rotated relative to the further male fastener, thereby engaging respective ridges of the third female fastener and the further male fastener. Alternatively, the further male fastener can be rotated relative to the third female fastener, thereby engaging respective ridges of the further male fastener and the third female fastener.

The third female fastener may be coupled to the second male fastener in such a manner, that a longitudinal direction of the tubular part of the third female fastener lies substantially perpendicular to a longitudinal direction of the bolt-shaped part of the second male fastener. The coupling between the third female fastener and the second male fastener may be achieved by a further tubular part of the third female fastener put over the bolt-shaped part of the second male fastener. Alternatively, the third female fastener and the second male fastener may be welded together or attached by an adhesive. Also alternatively, the third female fastener and the second male fastener may be formed integrally, i.e., built as one piece.

Such a fixation assembly provides for a variably spaced fixation between two objects allowing variable distances in three directions. In particular, if the tubular part of the third female fastener is arranged substantially perpendicular to the longitudinal direction of the second male fastener and also substantially perpendicular to the longitudinal direction of the first male fastener, fixation with variable distances in three directions can be achieved.

According to a further aspect, the circumferential outer surface of the bolt-shaped part of the first male fastener can include in a longitudinal direction of the bolt-shaped part two areas each including at least one ridged section and at least one plain section alternately arranged on the circumferential path in the cross-sectional plane of the respective area of the bolt-shaped part, wherein each ridged section includes at least one ridge. This arrangement provides for coupling of two female fasteners on the respective areas.

In a variant, the at least one ridge in a first of the two areas has a positive pitch value and the at least one ridge in a second of the two areas has a negative pitch value. The provision of two different pitch values, and, in particular, a positive and a negative pitch value, provides for a fixation assembly where rotation of the inserted first male fastener affixes the two female fasteners with a distance that can be adjusted over a greater range.

For example, the fixation assembly may comprise a fourth female fastener, which can include a tubular part having a circumferential inner surface, wherein the circumferential inner surface of the fourth female fastener includes alternately on a circumferential path in a cross-sectional plane of the tubular part of the fourth female fastener at least one ridged section and at least one plain section, wherein each ridged section may include at least one ridge having a negative pitch. In correspondence with the first male fastener, the at least one ridge of first female fastener may have a positive pitch value. Thus, the first male fastener can be inserted into the first female fastener and the fourth female fastener in a state where the cross-sectional projection of the at least one ridged section of the first male fastener coincides with the cross-sectional projection of the at least one plain section of the first female fastener and with a cross-sectional projection of the at least one plain section of the fourth female fastener. The first male fastener may be rotated relative to the first and fourth female fasteners, thereby engaging respective ridges of the first area of the first male fastener and the first female fastener and engaging respective ridges of the second area of the first male fastener and the fourth female fastener.

In accordance with a variant, the first female fastener can be fixed to a first object, while the fourth female fastener can be movably coupled to the first object. For instance, the movably coupled fourth female fastener may be arranged in an elongated hole within the first object. The space available for the fourth female fastener in the elongated hole allows adjustment of position of the fourth female fastener relative to the first object. For instance, the fourth female fastener may be employed to couple a second object to the first object and to compensate tolerances between the first and second object.

The first male fastener can further comprise a rubber bush arranged at a proximal end of the bolt-shaped part, i.e., opposite to the free end of the first male fastener. The rubber bush can move the fourth female fastener within the elongated hole within the first object during insertion of the first male fastener. When rotating the first male fastener, the rubber bush can be compressed by the fourth female fastener, so that the fourth female fastener has room for movement in the elongated hole during its position adjustment.

According to an implementation, at least one of the first female fastener and the fourth female fastener is designed as a barrel nut. This implementation provides for the employment of standardized elements and, hence, a cost-efficient implementation of the fixation assembly.

Furthermore, in case of ridges having a positive and negative pitch provided in the first and fourth female fastener, respectively, the ridges in the two areas of the first male fastener also have respective positive and negative pitches. After inserting the first male fastener into the first and fourth female fasteners, a rotation of the first male fastener engages the ridges of the first male fastener with the ridges of the first and fourth female fasteners. A further rotation then allows a movement of the fourth female fastener within the elongated hole along a longitudinal axis of the first male fastener, due to the first female fastener being fixedly coupled to the first object. Depending on the degree of rotation of the first male fastener a gap between the fourth female fastener and an end of the elongated hole in the longitudinal direction of the first male fastener can be set. Thus, a fast fixation of a first object to a second object can be achieved, while a predefined distance between the two objects, e.g., due to tolerances of the first and/or second object, can be set equally fast.

The bolt-shaped part of the male fastener described in any of the above aspects, variants and implementations may have a circular cross-section. Likewise, the circumferential surface of the tubular part of any of the female fasteners described with respect to the above aspects, variants and implementations may have a circular cross-section. However, the bolt-shaped part as well as the tubular part may have different cross-sectional shapes. For instance, one of these parts may have an elliptical cross-sectional shape. This would provide for a locking of the respective male fastener and female fastener.

BRIEF DESCRIPTION OF THE DRAWINGS

Preferred embodiments of a fixation assembly are described in greater detail with reference to the attached schematic drawings in the following, wherein FIG. 2 shows a sectional view and cross-sections of a male fastener and a female fastener in a decoupled position as well as a sectional view of the male and female fasteners in a coupled position, FIG. 7 shows a schematic illustration of a sectional view of ridges on a circumferential outer surface of the first male fastener or the first female fastener as well as a side view of a longitudinal end thereof, FIG. 11 shows a cross-section and a sectional view of another variant of a first male fastener and a first female fastener in a connected state, FIG. 12 shows a cross-section and a sectional view of a further variant of a first male fastener and a first female fastener in a connected state.

The following detailed description of the schematic drawings focuses on the illustrated variants and implementations of fixation assemblies. The present disclosure is not limited to the described and illustrated fixation assemblies, but includes combinations of the described variants and implementations of these fixation assemblies.

DETAILED DESCRIPTION OF THE PREFERRED EMBODIMENTS

Figure 1:
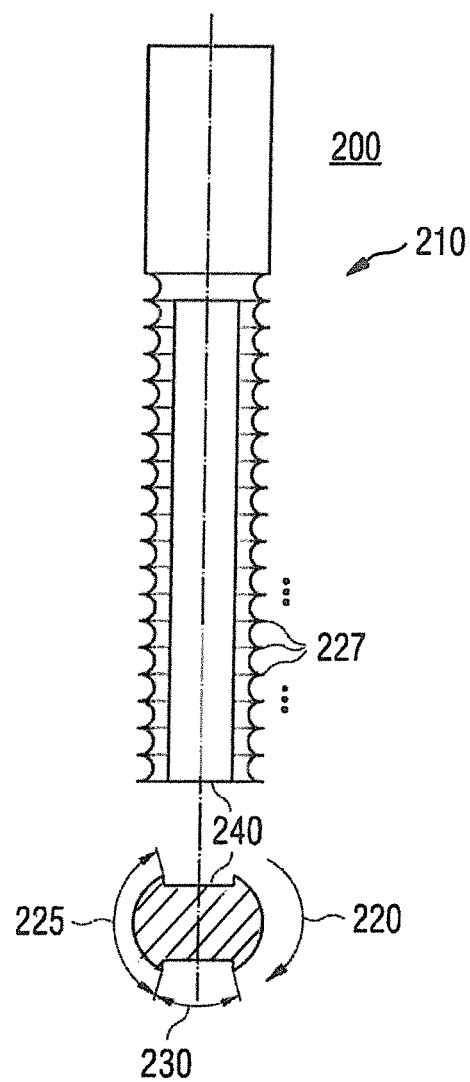
FIG. 1 shows a side view and cross-section of a male fastener.

FIG. 1 shows a side view and cross-section of a first male fastener 200. The first male fastener 200 includes a bolt-shaped part 210 having a circumferential outer surface. The circumferential outer surface includes alternately, on a circumferential path 220 in a cross-sectional plane of the bolt-shaped part 210, at least one ridged section 225 and at least one plane section 230. The circumferential path 220 is only illustrated as an arrow. However, it is to be understood that this circumferential path 220 follows the entire circumferential outer surface of the bolt-shaped part 210.

The illustrated cross-section of bolt-shaped part 210 includes two symmetrically arranged ridged sections 225 on opposing sides and two plain sections 230 therebetween. However, the first male fastener 200 can include any number of ridged sections 225 and also one or more ridged sections 225 of different sizes, i.e., of different arc lengths.

Each ridged section 225 includes at least one ridge 227. Such ridge 227 is arranged substantially in a cross-sectional plane of the bolt-shaped part 210. Adjacent ridges 227 are arranged parallel to one another in a longitudinal direction of the bolt-shaped part 210. The ridge(s) 227 can have a pitch value of zero or any positive or negative pitch value in the longitudinal direction of the bolt shaped part 210.

Furthermore, the plain section(s) 230 of the bolt-shaped part 210 are sections or segments on the circumferential outer surface of the bolt-shaped part 210 that do not include a ridge. For instance, a plain section 230 may have a circumferential outer surface following the outer surface of a valley or bottom of the ridge 227. Alternatively or additionally, at least a part of the circumferential outer surface at the plain section 230 may form a recess 240, i.e., is recessed towards a center of the bolt-shaped part 210 in a cross-sectional plane thereof.

FIG. 2(a) shows a sectional view and cross-sections of the first male fastener 200 and a first female fastener 300 in a decoupled position. FIG. 2(b) shows a sectional view of the first male fastener 200 and first female fastener 300 in a coupled position.

The first female fastener 300 comprises a tubular part 310 having a circumferential inner surface. The circumferential inner surface includes alternately on a circumferential path 320 in a cross-sectional plane of the tubular part 310 at least one ridged section 325 and at least one plain section 330. As with the first male fastener 200, the circumferential path 320 of the inner surface of the tubular part 310 is illustrated as an arrow but includes the path of an entire round on the circumferential inner surface.

Each ridged section 325 includes at least one ridge 327 that is arranged on the inner surface of the tubular part 310 in a corresponding manner to the ridge 227 of the first male fastener. For instance, the ridge 327 of the first female fastener is arranged substantially in a cross-sectional plane of the tubular part 310. The ridge 327 can have a pitch value of zero or any positive or negative pitch value. Furthermore, the ridge 327 may extend over a segment of the circumferential path 320 corresponding to the respective ridged section 325, i.e., the ridge 327 begins and ends at one or two adjacent plain sections 330.

As with the plain section(s) 230 of the first male fastener 200, the plain section(s) 330 of the tubular part 310 can include a recess 340. For instance, a plain section 330 may have a circumferential inner surface following the inner surface of a valley or bottom of the ridge 327, i.e., is flush with the inner surface of the valley or bottom of the ridge 327. Alternatively or additionally, at least a part of the circumferential inner surface at the plain section 330 may be recessed towards an exterior of the tubular part 310 in a cross-sectional plane thereof.

As can be derived from the cross-sections of the first male fastener 200 and the first female fastener 300 on the left-hand side of FIG. 2(a), the first male fastener 200 can be inserted into the first female fastener 300 in a state where a cross-sectional projection of the at least one ridged section 225 of the first male fastener 200 coincides with a cross-sectional projection of the at least one plain section 330 of the first female fastener 300. Thus, the bolt-shaped part 210 of the first male fastener 200 has a cross-sectional projection that is adapted to the cross-sectional projection of the tubular part 310 of the first female fastener 300, so that the first male fastener 200 can be inserted into the tubular part 310 of the first female fastener 300 without intersecting or engaging therewith.

After insertion, one of the first male fastener 200 and the first female fastener 300 can be rotated relative to the other fastener (200, 300), thereby engaging respective ridges 227 and 327 of the first male fastener 200 and the first female fastener 300. This is illustrated in FIG. 2 as two arrows representing insertion and rotation of the fastener(s) 200 and 300. FIG. 2(b) depicts the engaged state of the first male fastener 200 and the first female fastener 300. As can be derived from these drawings the ridge(s) 227 of the first male fastener 200 are engaged with the ridge(s) 327 of the first female fastener 300. The first male fastener 200 and the first female fastener 300 provide a very advantageous fixation assembly 100, since the two fasteners 200 and 300 can be inserted in a very fast manner and can be brought into a holding or locked position by a short rotation of one of the fasteners 200 and 300.

If at least one of the first male fastener 200 and the first female fastener 300 include a plurality of ridges 227, 327 in a longitudinal direction, a plurality of levels of insertion and fixation can be achieved. In other words, if the first male fastener 200 is connected to a first object and the first female fastener 300 is connected to a second object, the two objects can be affixed variably spaced from each other with the fixation assembly 100.

Figure 3:
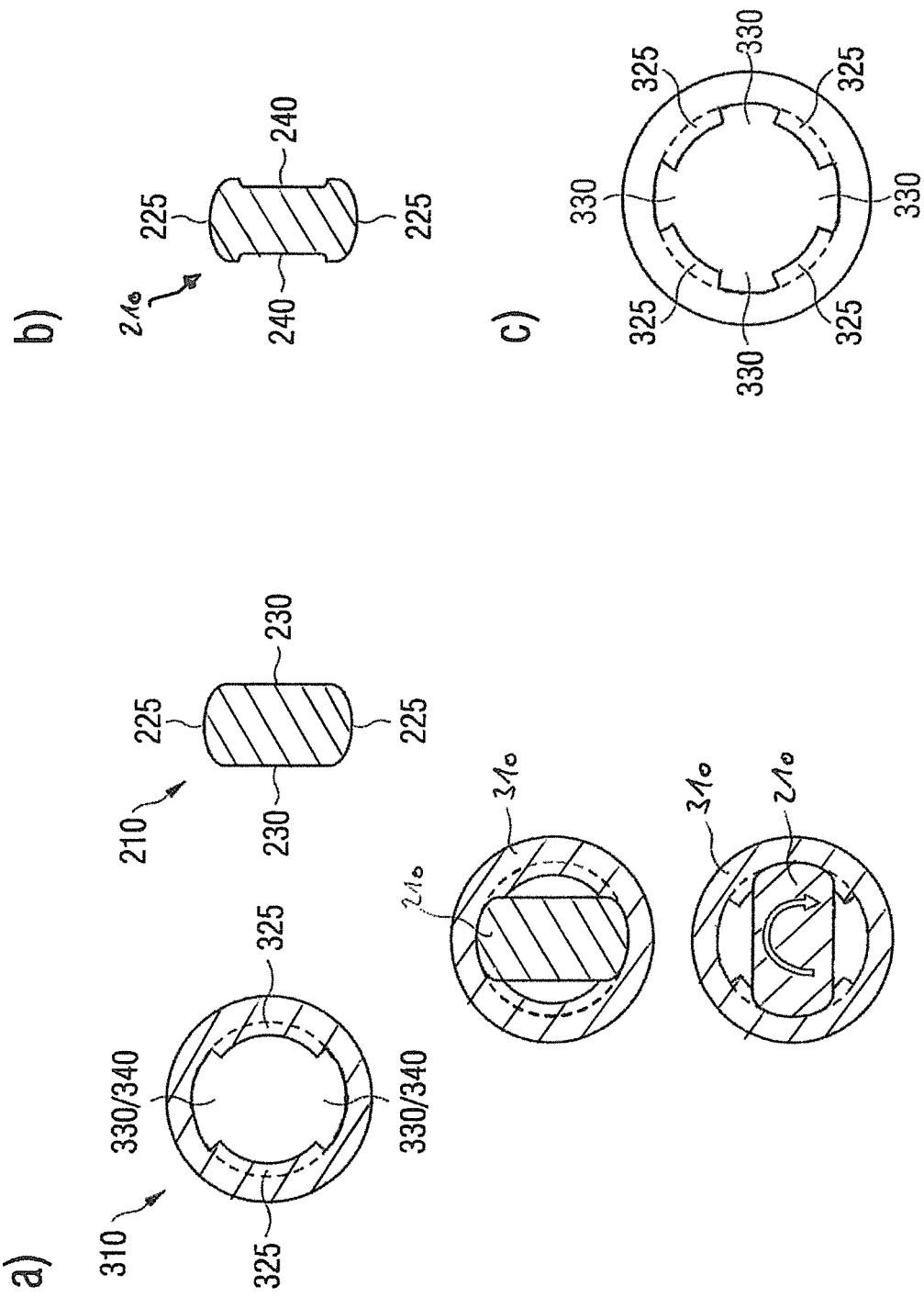
FIG. 3 shows cross-sections of a male fastener and a female fastener at certain positions during the coupling and fixation movements as well as variants of the male and female fasteners.

FIG. 3 shows cross-sections of a male fastener 200 and a female fastener 300 at certain positions during the coupling and fixation movements as well as variants of the male and female fasteners. In particular, FIG. 3(a) illustrates the tubular part 310 of the first female fastener 300 and the bolt-shaped part 210 of the first male fastener 200 separated from each other. As can be derived from this drawing, the cross-sectional projection of the first male fastener 200 fits into the cross-sectional projection (opening) of the first female fastener 300. When inserted into each other, as depicted in the middle of FIG. 3(a), the first male fastener 200 can be brought to a certain level of insertion, i.e. can be inserted into the tubular part 310 by a certain extent in the longitudinal direction of the bolt-shaped part 210 and the tubular part 310. The level of insertion can be chosen depending on the required or desired distance between two objects affixed with fasteners 200 and 300. When the distance between the two objects (and the respective fasteners 200 and 300) is achieved, one of the fasteners 200 and 300 can be rotated. In the illustration of FIG. 3(a) the male fastener 200 is rotated clockwise. Thereby, the ridges 227 and 327 of the respective fasteners 200 and 300 become engaged with each other. This engagement blocks any further longitudinal movement of the first male fastener 200 or first female fastener 300.

In order to improve the insertion capabilities of the first male fastener 200, the plain sections 230 may include or form a recess 240 as it is illustrated in FIG. 3(b). This recess 240 avoids engagement of the bolt-shaped part 210 of the first male fastener 200 with the ridges 327 of the tubular part 310 of the first female fastener 300 during insertion of the bolt-shaped part 210 into the tubular part 310. Likewise, the plain sections 330 of the tubular part 310 may include or form a recess 340 to avoid engagement of ridges 227 of the bolt-shaped part 210 with the tubular part 310.

In accordance with another implementation, illustrated in FIG. 3(c), one of the bolt shaped part 210 and the tubular part 310 may include four ridged sections 225 and 325 and/or four plain sections 230 and 330. Alternatively, the tubular part 310 includes four plain sections 330, while the first male fastener 200 may include only two ridged sections 225 having a cross-sectional projection corresponding to the plain sections 330 of the tubular part 310. Thus, the bolt-shaped part 210 can be inserted into the tubular part 310 at two different rotation angles. In addition, for an engagement of the respective ridges 227 and 327 one of the bolt shaped part 210 and tubular part 310 has to be rotated only half the distance than in case of the implementation illustrated in FIG. 3(a), where the tubular part 310 has only two plain sections 330.

It is to be understood that the bolt shaped part 210 and the tubular part 310 may include any number of ridged sections 225 and 325 as well as any number of plain sections 230 and 330. To be inserted into each other, every ridge section 225 of the bolt-shaped part 210 needs to fit into one respective plain section 330 of the tubular part 310 and vice versa. The ridged sections 225 and 325 as well as the plain sections 230 and 330 can also be arranged in a non-symmetrical manner at any angle.

Figure 4:
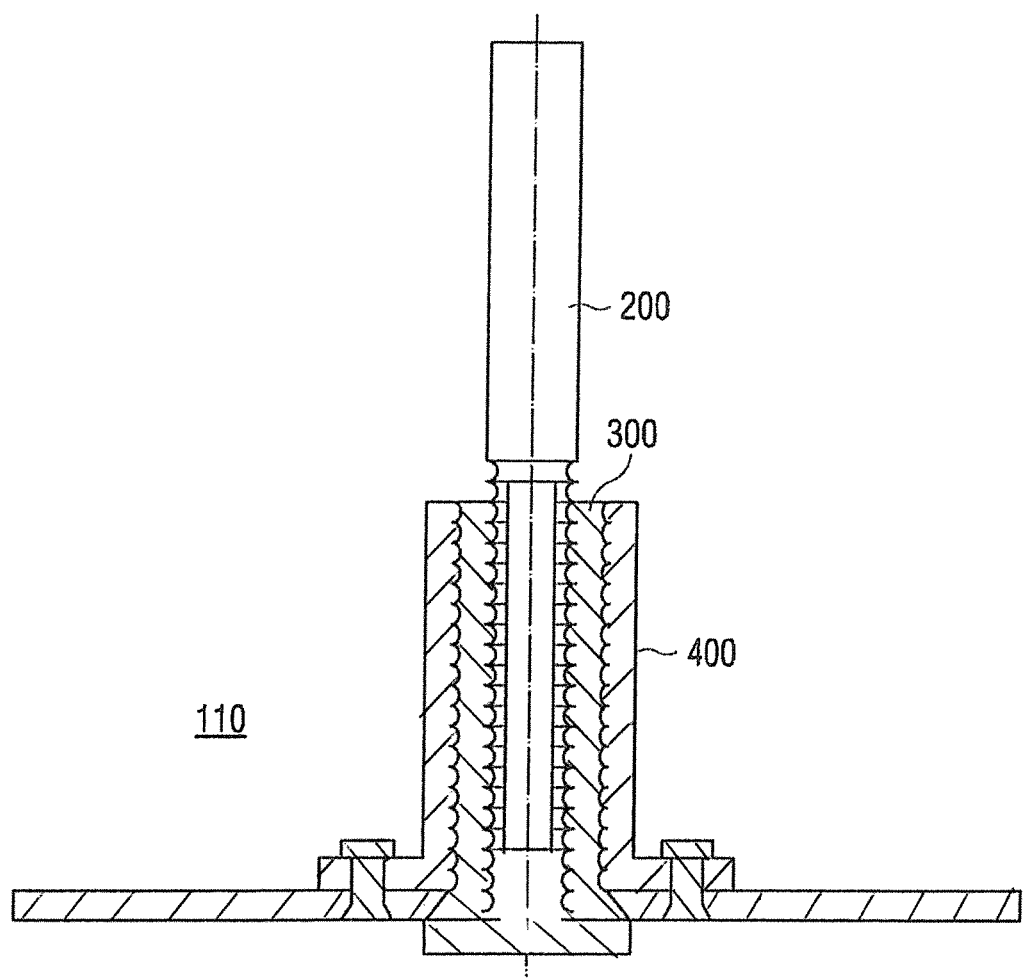
FIG. 4 shows a sectional view of a variant of a first male fastener, a first female fastener and second female fastener in a connected state.
Figure 5:
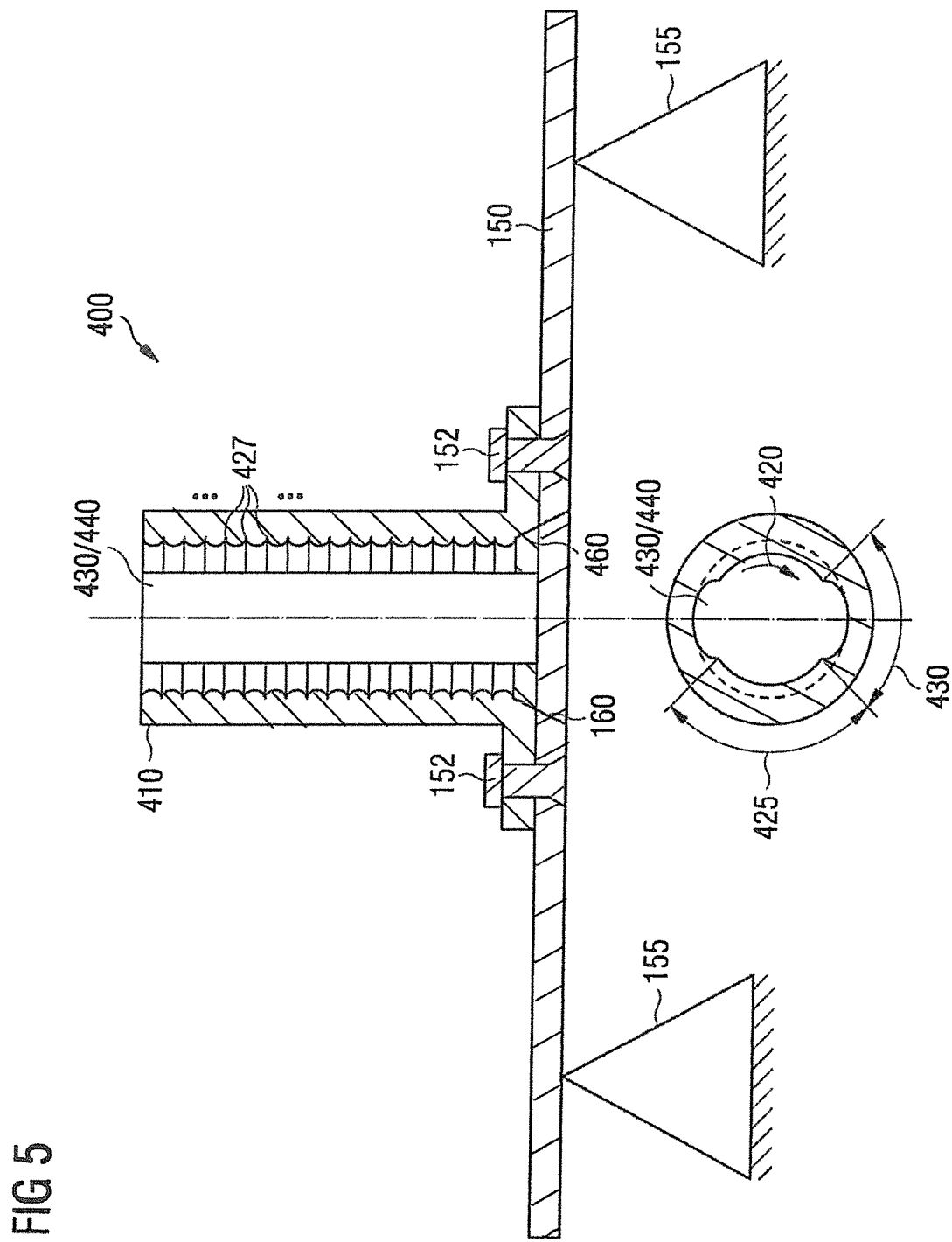
FIG. 5 shows a sectional view and cross-section of the second female fastener according to FIG. 4.
Figure 6:
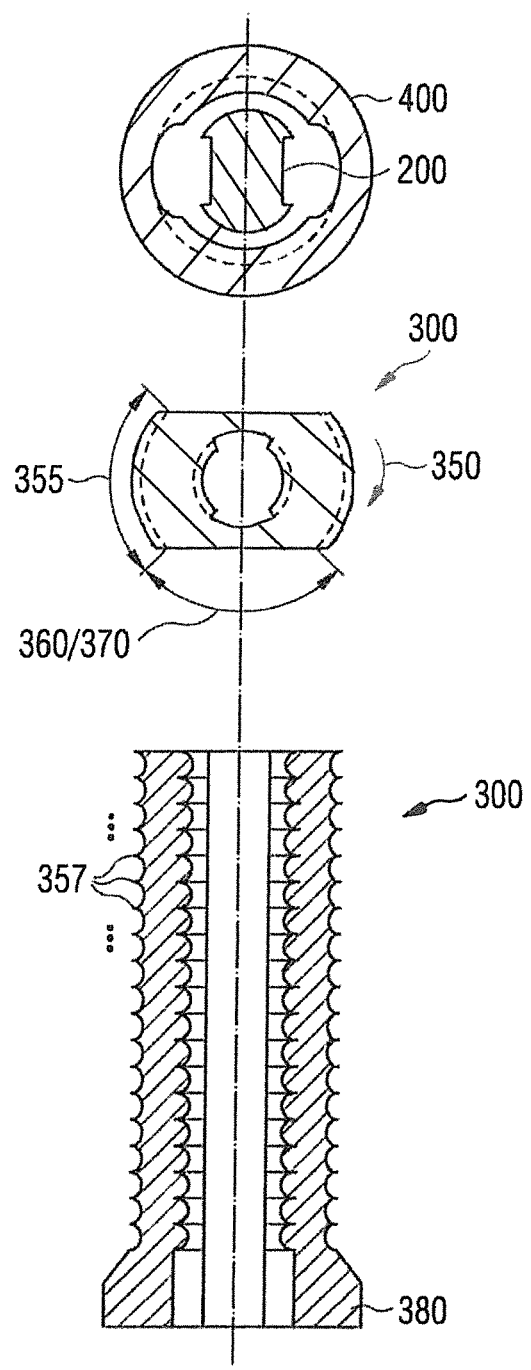
FIG. 6 shows a sectional view of the first female fastener and cross-sections of the first male fastener, the first female fastener and the second female fastener according to FIG. 4.

A further variation of a fixation assembly 110 is illustrated in FIG. 4 showing a sectional view of a first male fastener 200, a first female fastener 300 and a second female fastener 400 in a connected state. Compared to the fixation assembly 100 of FIGS. 1 to 3, the first female fastener 300 further includes coupling means on its circumferential outer surface for engagement with corresponding coupling means of the second female fastener 400. This further variation of the fixation assembly 110 will also be described with reference to FIGS. 5 and 6, which show a sectional view and a cross-section of the second female fastener 400 and a sectional view of the first female fastener 300 according to FIG. 4, respectively. FIG. 6 additionally illustrates cross-sections of the first male fastener 200, the first female fastener 100 and the second female fastener 400.

The second female fastener 400 comprises a tubular part 410 having a circumferential inner surface. The circumferential inner surface includes alternately on a circumferential path 420 in a cross-sectional plane of the tubular part 410 at least one ridged section 425 and at least one plain section 430, where each ridged section 425 includes at least one ridge 427. Therefore, an interior of the second female fastener 400 may be configured in the same manner as an interior of the first female fastener 300.

The fixation assembly 110 can be used to affix a first object 150 to second object (not shown). For example, the first object 150 can be connected to the second female fastener 400 with connecting means 152, such as screws, bolts, adhesive(s), etc. The first object 150 can be placed on a stand or jig 155. Using the jig 155 the first object 150 can be brought into the position relative to the second object, in which it is to be affixed to the second object. This position may include that the second female fastener 400 is put over the first male fastener 200. A cross-sectional view of this relative position of the first male fastener 200 and the second female fastener 400 is illustrated at the top of FIG. 6. As an example only, the first object 150 maybe a ceiling or similar panel of an aircraft passenger cabin that is moved into the interior of the passenger cabin on the jig 155. The first male fastener 200 can be attached to a primary structure of the aircraft before installing the second object. Alternatively, the first male fastener 200 can be connected to a structural element attached to the primary structure of the aircraft, such as a longitudinal installation bar.

In order to affix the first object 150 in this position, the first female fastener 300 can form a connecting bush. The tubular part 310 of the first female fastener 300 has a circumferential outer surface, which includes alternately on a circumferential path 350 in the cross-sectional plane of the tubular part 310 at least one ridged section 355 and at least one plain section 360. Each ridged section 355 includes at least one ridge 357. The plane sections 360 may also form or include a recess 370 similar to the recess 240 of the first male fastener 200. Thus, in addition to the ridged sections 325 and the plain sections 330 of the circumferential inner surface of the tubular part 310 the first female fastener 300 comprises a structure on its circumferential outer surface similar to the circumferential outer surface of the first male fastener 200.

As can be derived from the cross-sections illustrated in FIG. 6, as well as the sectional view of FIG. 4, the first female fastener 300 forming a connecting bush can be inserted into the free space between the first male fastener 200 and the second female fastener 400. In other words, the first female fastener 300 can be inserted into the second female fastener 400 in a state where a cross-sectional projection of the at least one ridged section 355 of the first female fastener 300 coincides with a cross-sectional projection of the at least one plain section 430 of the second female fastener 400. At the same time the first female fastener 300 is put over the first male fastener 200 in a state where a cross-sectional projection of the at least one ridged section 325 of the first female fastener 300 coincides with a cross-sectional projection of the at least one plain section 230 of the first male fastener 200.

Thereafter, the first female fastener 300 can be rotated relative to the first male fastener 200 and relative to the second female fastener 400, thereby engaging respective ridges 357 of the circumferential outer surface of the first female fastener 300 and respective ridges 427 of the circumferential inner surface of the second female fastener 400, and engaging respective ridges 327 of the circumferential inner surface of the first female fastener 300 and respective ridges 227 of the circumferential outer surface of the first male fastener 200. Thus, a fixation between the first male fastener 200 and the second female fastener 400 is achieved via the first female fastener 300. The first object 150, therefore, can be easily attached to the second object.

Referring to FIG. 7, a sectional view of ridges on a circumferential outer surface (FIG. 7(a)) and a side view of a longitudinal end thereof (FIG. 7(b)) are illustrated. The illustrated ridges of outer and inner surfaces may relate to any of the disclosed male and female fasteners. For instance, FIG. 7(a) may show ridges 227, 357 on a circumferential outer surface of the first male fastener 200 or the first female fastener 300. Likewise, ridges 327, 427 may be of a circumferential inner surface of the first female fastener 300 or the second female fastener 400. For the sake of clarity only one ridge 327, 427 of a circumferential inner surface is depicted. It is to be understood that more than one ridge 327, 427 can be arranged on the circumferential inner surface.

With respect to the upper half of the sectional view of FIG. 7(a) a plurality of adjacent ridges 227a, 357a may be arranged on the circumferential outer surface of the first male fastener 200 and/or the first female fastener 300. This plurality of ridges 227a, 357a allows an engagement with a specific one of the ridges 327a, 427a of the first female fastener 300 or second female fastener 400 at any desired position of the bolt-shaped part 210 or tubular part 310. In other words, the bolt-shaped part 210 or tubular part 310 can be inserted into the first female fastener 300 or the second female fastener 400 to a certain extent and by rotation of the bolt-shaped part 210 or tubular part 310 can be brought into engagement with the specific ridge 327a, 427a providing a fixation of the respective fasteners at the desired insertion level (insertion extent).

The ridges 227a, 357a, 327a, 427a may have tapered ends with respect to the circumferential path 220, 320, 350, 420. Thus, the ends of each ridge 227a, 357a, 327a, 427a with respect to an adjacent plain section 230, 330, 360, 430 may be tapered. This provides for an easier engagement with the corresponding ridge 227a, 357a, 327a, 427a of the opposed fastener 200, 300, 400. Likewise, the longitudinal end 250, 385 of the bolt-shaped part 210 or tubular part 310 may be tapered towards the center of the bolt-shaped part 210 or tubular part 310 as illustrated in the FIG. 7(b). This provides for an easier insertion of the bolt-shaped part 210 or tubular part 310 into the corresponding fastener.

Furthermore, any of the ridge(s) 227a, 327a, 357a, 427a can have a pitch value of zero. Thus, one ridge 227a, 327a, 357a, 427a extends within a cross-sectional plane substantially perpendicular to the longitudinal direction of the bolt-shaped part 210 or the tubular part 310, 410. In case of a plurality of ridges 227a, 327a, 357a, 427a, each ridge 227a, 327a, 357a, 427a is arranged parallel to the other ridges and also fully extends within the cross-sectional plane.

Alternatively, the ridge(s) 227a, 327a, 357a, 427a of the first male fastener 200, the first female fastener 300 and/or the second female fastener 400 can have a pitch value greater than zero. In other words, when following the circumferential path 220, 320, 350, 420 the location of the ridge 227a, 327a, 357a, 427a changes in the longitudinal direction. The pitch value is the measure for a distance in the longitudinal direction of the bolt-shaped part 210 or tubular part 310, 410 between a position of a ridge 227a, 327a, 357a, 427a and a position when following the ridge 227a, 327a, 357a, 427a a full turn around the circumferential path 220, 320, 350, 420 (similar to the thread of a screw). Since the bolt-shaped part 210 or tubular part 310, 410 also includes plain sections 230, 330, 360, 430, there is no continuous (helical) thread or ridge as it would be available on a screw. Nevertheless, when ridges 227a, 327a, 357a, 427a having a pitch value greater than zero engage, a rotation of the engaging ridges 227a, 327a, 357a, 427a generates a longitudinal movement of at least one of the respective fasteners 200, 300, 400. Besides the pitch value the extent of the longitudinal movement also depends on the available ridge length, i.e., the degree of possible rotation before the ridges 227a, 327a, 357a, 427a of corresponding fasteners 200, 300, 400 become disengaged again. The maximum possible longitudinal movement can be achieved with ridges 227a, 327a, 357a, 427a extending half the length along the circumferential path 220, 320, 350, 420.

With respect to the lower half of FIG. 7(a) the bolt-shaped part 210 of the first male fastener 200 may include at least one second ridged section 225b on the circumferential path 220 in the cross-sectional plane of the bolt-shaped part 210, in addition to a first ridged section 225a illustrated in the upper half of FIG. 7(a). The at least one ridge 227b of the second ridged section 225b is located differently in a longitudinal direction of the bolt-shaped part than the at least one ridge 227a of the first ridged section 225a. As illustrated in FIG. 7(a), the ridges 227a, 227b of the bolt-shaped part 210 are spaced in the longitudinal direction by a certain distance or offset Δ.

Furthermore, the tubular part 310 of the first female fastener 300 can include one ridged section 325 on the circumferential path 320 in the cross-sectional plane of the tubular part 310. This arrangement allows an engagement of respective ridges 227a, 277b, 327 at two different positions in a longitudinal direction of the bolt-shaped part 210 depending on which ridged section 225a, 225b becomes engaged with the ridges 327 of the tubular part 310. The two different positions in longitudinal direction are spaced apart by the distance Δ. Thus, the engagement of the first fastener 200 with respect to the second fastener 300 can be achieved with finer granularity regarding an insertion level in longitudinal direction.

Likewise, the tubular part 310 of the first female fastener 300 can include at least two ridged sections 325a, 325b on the circumferential path 320 in the cross-sectional plane of the tubular part 310, wherein the at least one ridge 327a of a first ridged section 325a is located differently in a longitudinal direction of the tubular part than the at least one ridge 327b of a second ridged section 325b. The bolt-shaped part 210 of the first male fastener can include one ridged section 225 on the circumferential path 220 in the cross-sectional plane of the bolt-shaped part 210 to engage with one of the ridges 327a, 327b of the first ridged section 325a or the second ridged section 325b.

A similar arrangement of ridged sections 355, 425 of the first female fastener 300 (on its circumferential outer surface) and the second female fastener 400 including a variation of the location of the ridges 357, 427 in longitudinal direction by the distance Δ can be provided. In addition, the ridges 227a, 227b, 327a, 327b, 357, 427 of the first male fastener 200, the first female fastener 300 and the second female fastener 400 may be offset by the distance Δ and may further have any pitch value described above. Thus, a fine engaging granularity can be achieved, while a distance adjustment is also possible due to a positive or negative pitch value.

In addition, the first female fastener 300 can comprise a countersunk head 380. Likewise, the second female fastener 400 or the first object 150 attached to the second female fastener 400 can comprise a corresponding countersink 460, 160. When coupled to each other, the first female fastener 300 can hold the second female fastener 400 and/or the first object 150 by engaging its countersunk head 380 with the countersink 460, 160. Such engagement is illustrated in FIG. 4 at a bottom part of first female fastener 300, i.e., at the first object 150. It allows a fixation of the first object 152 the first male fastener 200 from an open side of the first object 150. Using this implementation, at least the first female fastener 300 will be visible after fixation.

Figure 8:
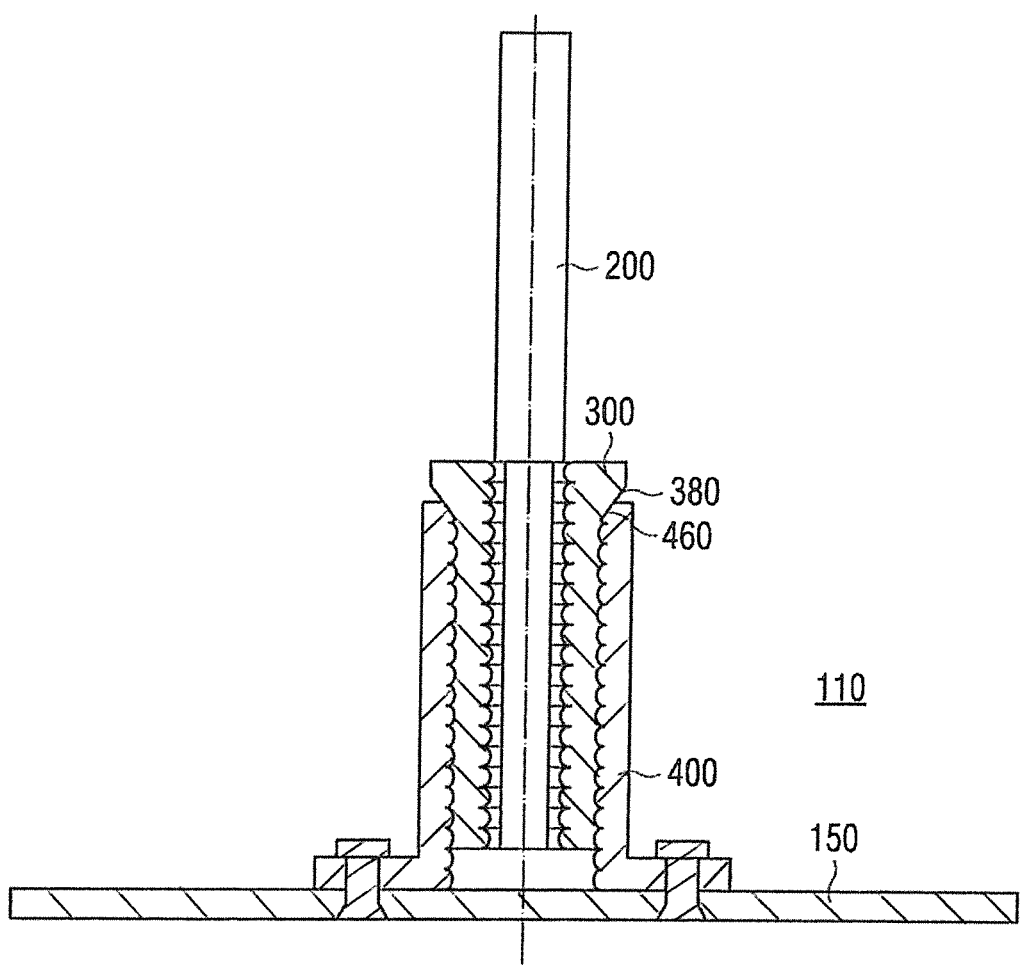
FIG. 8 shows a sectional view of a further variant of a first male fastener, a first female fastener and a second female fastener in a connected state.

In accordance with an alternative implementation, the countersunk head 380 of the first female fastener 300 may be brought into engagement with a countersink 460 at an upper portion of second female fastener 400. Such engagement is illustrated in FIG. 8. This implementation allows the first object 150 to be flush throughout the area where the first male fastener 200 and the first female fastener 300 will be arranged. Thus, the visible side of the first object 150 may have a neat appearance. However, for the insertion of the first female fastener 300, the "interior" (non-visible) side of the first object 150 has to be reachable for insertion of the first female fastener 300 (the connecting bush).

Figure 9:
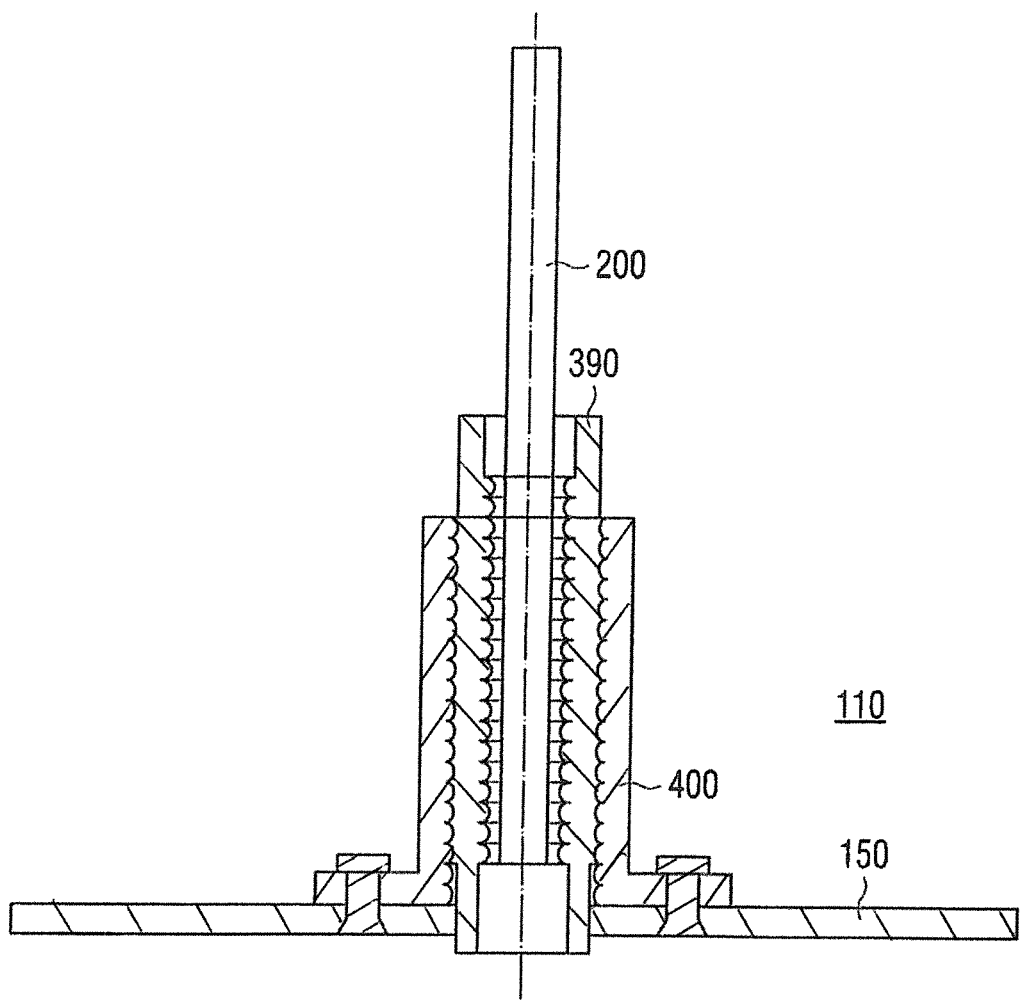
FIG. 9 shows a sectional view of yet another variant of a first male fastener, a first female fastener and a second female fastener in a connected state.

In accordance with another implementation of the fixation assembly 110, the first female fastener 300 can comprise at at least one longitudinal end of the tubular part 310 attachment means 390 configured to receive a tool (not shown) for rotating the first female fastener 300. A sectional view of such variant is illustrated in FIG. 9.

Figure 10:
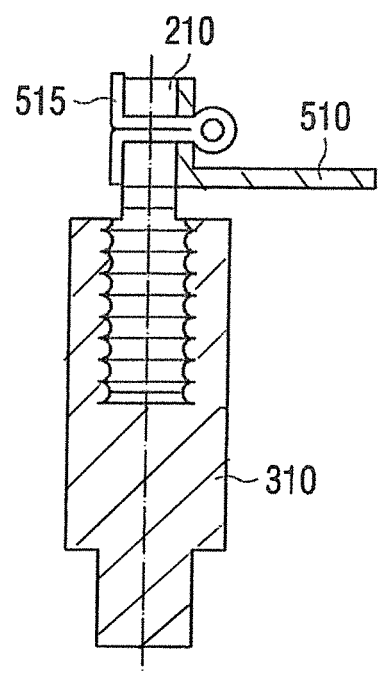
FIG. 10 shows a sectional view of a first male fastener coupled to a first female fastener and a securing element for the first male fastener.

Furthermore, after fixation of the first male fastener 200 to the first female fastener 300, a rotation of the two fasteners 200, 300 with respect to each other can be prevented. For instance, a locking of the engaged ridges 227, 327 can be achieved by an adhesive or other locking mechanisms of the ridges 227, 327. In addition or alternatively, a securing element 510 can be arranged in the vicinity of the first male fastener 200, e.g., next to the bolt-shaped part 210, as illustrated in FIG. 10. Furthermore, a hole or bore in the first male fastener 200 and the securing element 510 may be arranged, so that a securing pin 515 can be inserted through the holes or bores. Thus, a rotation of the first male fastener 200 can be locked by the securing pin 515.

Another exemplary implementation is illustrated in FIG. 11 showing a cross-section and a sectional view of a first male fastener 200 and a first female fastener 300 in a connected state. The first female fastener 300 may be a lug or other structural element, such as a fixation element connected to the primary structure of an aircraft. The first male fastener 200 comprises a bore 615 in the bolt-shaped part 210 substantially perpendicular to a longitudinal axis of the bolt-shaped part 210. The bore 615 has a circumferential inner surface.

According to an example, the circumferential inner surface of the bore 615 includes a thread 617. This allows screwing a corresponding screw into bore 615 for affixing an object to the first male fastener 200. The bore 615 may be arranged at a section of the bolt-shaped part 210 that is inserted into the tubular part 310 of the first female fastener 300 as illustrated in FIG. 11. In order to provide space for the screw, a receiving area 610, such as a void, is provided in the tubular part 310 of the first female fastener 300. Since bolt-shaped part 210 can be affixed to tubular part 310 at different insertion levels (different heights or vertical levels in "Section A-A" of FIG. 11), the receiving area 610 may form an elongated void in tubular part 310 extending in a longitudinal direction of the tubular part 310.

Another exemplary fixation assembly 120 is illustrated in FIG. 12, where the circumferential inner surface of the bore 615 includes alternately on a circumferential path 620 in a cross-sectional plane of the bore 615 at least one ridged section 625 and at least one plain section 630. Each ridged section 625 includes at least one ridge 627. As for the first female fastener 300, the bore 615 can include the same components and elements as described above for the tubular part 310. For instance, the plain section(s) 630 may form a recess 640 and/or the number and size of the ridged section(s) 625 and plain section(s) 630 may vary. The tubular part 310 of the first female fastener 300 includes a receiving area 610, if the bore 615 is arranged in a section of the bolt-shaped part 210 that will be inserted in the tubular part 310. The receiving area 610 may extend in a longitudinal direction of the tubular part 310, in order to provide enough room for any element inserted into bore 615 even if bolt-shaped part 210 is inserted at different insertion levels.

Figure 13:
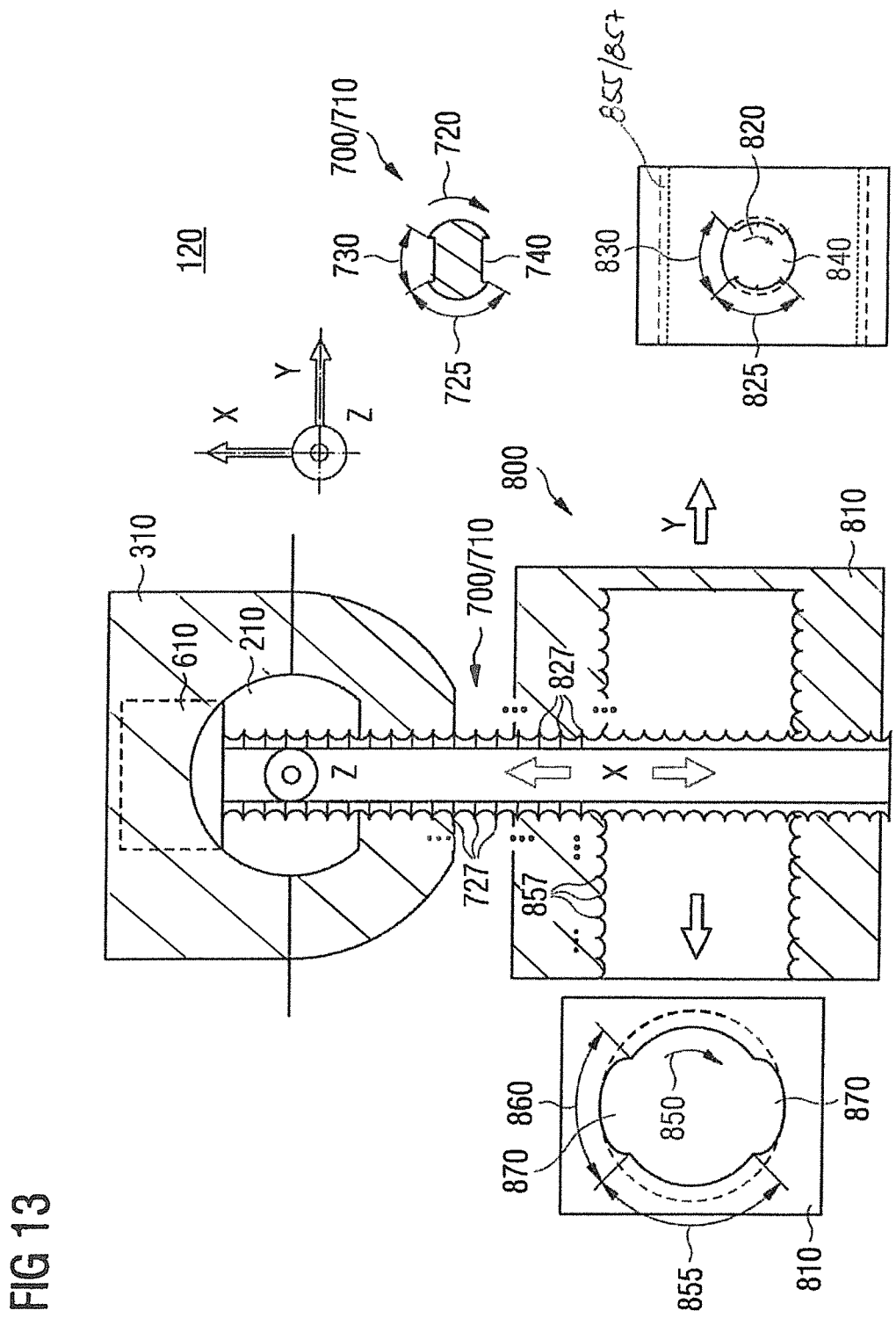
FIG. 13 shows a cross-section of an implementation of the first male fastener and the first female fastener of FIG. 12 employing a second male fastener and a third female fastener.

FIG. 13 shows a cross-section of the first male fastener 200 and the first female fastener 300 of FIG. 12 further comprising a second male fastener 700 and a third female fastener 800. The second male fastener 700 is inserted into bore 615. The second male fastener 700 also comprising a bolt-shaped part 710 having a circumferential outer surface, wherein the circumferential outer surface of the bolt-shaped part 710 of the second male fastener 700 includes alternately, on a circumferential path 720 in a cross-sectional plane of the bolt-shaped part 710 of the second male fastener 700, at least one ridged section 725 and at least one plain section 730. Each ridged section 725 may include at least one ridge 727. The circumferential outer surface of the bolt-shaped part 710 of the second male fastener 700 can be formed in the same manner as the circumferential outer surface of the bolt-shaped part 210 of the first male fastener 200.

The second male fastener 700 is configured to be inserted into the bore 615 of the first male fastener 200 in a state where a cross-sectional projection of the at least one ridged section 725 of the second male fastener 700 coincides with a cross-sectional projection of the at least one plain section 630 of the bore 615 of the first male fastener 200. Furthermore, the second male fastener 700 can be rotated relative to the first male fastener 200, thereby engaging respective ridges 727, 627 of the second male fastener 700 and the bore 615 of the first male fastener 200. Such fixation assembly 120 provides for a fast fixation of two objects via the first female fastener 300, the first male fastener 200 and the second male fastener 700, which can easily be adjusted in two directions, i.e. along the Z-axis and X-axis illustrated in FIG. 13.

Additionally, the fixation assembly 120 may include a third female fastener 800 coupled to the second male fastener 700 and comprising a tubular part 810 having a circumferential inner surface. The circumferential inner surface is illustrated in the cross-sectional view shown at the left bottom region of FIG. 13. The circumferential inner surface of the third female fastener 800 includes alternately on a circumferential path 850 in a cross-sectional plane of the tubular part 810 of the third female fastener 800 at least one ridged section 855 and at least one plain section 860. Each ridged section 855 includes at least one ridge 857.

This structure allows to insert a further male fastener (not shown) into the third female fastener 800 in a state where a cross-sectional projection of at least one plain section of the further male fastener coincides with a cross-sectional projection of the at least one ridged section 855 of the third female fastener 800. The further male fastener can then be rotated relative to the third female fastener 800, thereby engaging respective ridges 857 of the third female fastener 800 and the further male fastener. The fixation concept of the third female fastener 800 and the further male fastener is the same as with the first female fastener 300 and the first male fastener 200. Thus, a further detailed description thereof is omitted. In any case, via the further male fastener a further degree of adjustment in the fixation assembly 120 can be achieved. As illustrated in FIG. 13, an adjustment along the Y-axis is possible by inserting the further male fastener into the tubular part 810 of the third female fastener 800 at the desired insertion level.

Furthermore, the third female fastener 800 is coupled to the second male fastener 700. This may be achieved by a fixed connection, such as using an adhesive or welding the second male fastener 700 to the third female fastener 800. The two fasteners 700, 800 may also be formed as an integral part. Alternatively, the third female fastener 800 may additionally include a bore substantially perpendicular to the longitudinal direction of the tubular part 810. A circumferential inner surface of this bore may include alternately on a circumferential path 820 in a cross-sectional plane of the bore of the third female fastener 800 at least one ridged section 825 and at least one plain section 830. Each ridged section 825 includes at least one ridge 827. Furthermore, the plain sections 830 may form a recess 840. The configuration of the circumferential inner surface of the bore is illustrated in the cross-sectional view shown at the right bottom region of FIG. 13. Thus, the second male fastener 700 and the third female fastener 800 may be coupled to one another using the same mechanism as for the other fasteners 200, 300.

Figure 14:
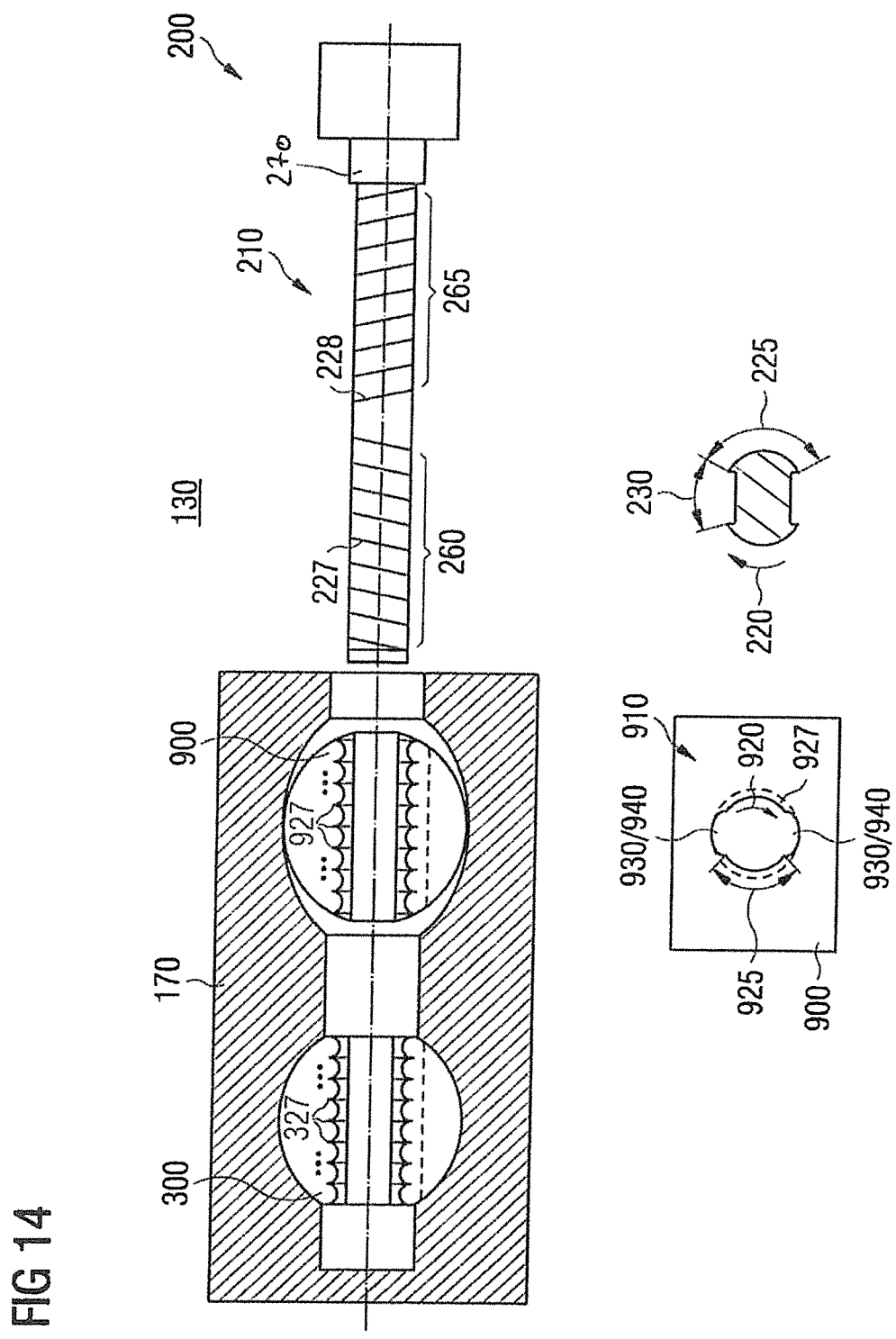
FIG. 14 shows a sectional view of yet another variant of a first male fastener and a first female fastener including a fourth female fastener in a detached position.

A further aspect of a fixation assembly 130 is illustrated in FIG. 14 showing a sectional view of a first male fastener 200 and a first female fastener 300 including a fourth female fastener 900. FIG. 14 shows the fasteners 200, 300 and 900 in a detached position.

In this fixation assembly 130 the circumferential outer surface of the bolt-shaped part 210 of the first male fastener 200 includes in a longitudinal direction of the bolt-shaped part 210 two areas 260, 265 each including alternately on the circumferential path 220 in the cross-sectional plane at least one ridged section 225 and at least one plain section 230. Each ridged section includes at least one ridge 227, 228. In contrast to the first male fastener 200 illustrated, for example, in FIG. 1, the at least one ridge 227 in a first area 260 of the two areas has a positive pitch value and the at least one ridge 228 in a second area 265 of the two areas has a negative pitch value.

While the fixation between the ridges 227, 327 of the first area 260 and the first female fastener 300 is the same as described with respect to FIG. 2, the first male fastener 200 is additionally coupled to a fourth female fastener 900. This fourth female fastener 900 comprises a tubular part 910 having a circumferential inner surface, wherein the circumferential inner surface of the fourth female fastener 900 includes alternately on a circumferential path 920 in a cross-sectional plane of the tubular part 910 of the fourth female fastener 900 at least one ridged section 925 and at least one plain section 930. Each ridged section 925 includes at least one ridge 927 having a negative pitch value.

The pitch value of the ridges 927 of the fourth female fastener 900 and the pitch value of the ridges 228 of the first male fastener 200 correspond to each other. Similarly, the pitch value of the ridges 327 of the first female fastener 300 and the pitch value of the ridges 227 of the first male fastener 200 correspond to each other, but have a different direction. For instance, the at least one ridge 327 of first female fastener 300 (as well as the corresponding at least one ridge 227 of the first male fastener 200) has a positive pitch value, while the at least one ridge 927 of the fourth female fastener 900 (as well as the corresponding at least one ridge 228 of the first male fastener 200) has a negative pitch value.

The first male fastener 200 can further include a rubber bush 270 arranged at a proximal end of the bolt-shaped part 210. The proximal end of the bolt-shaped part 210 is the end opposite to the free end of the first male fastener. For instance, the rubber bush 270 may be a cylindrically shaped bush that is slipped from a free end of the bolt-shaped part 210 passed the first area 260 and the second area 265. Alternatively, the rubber bush 270 can be a rubber coating at the proximal end of the bolt-shaped part 210. The rubber bush 270 can be made of rubber or any other elastic material.

Figure 15A:
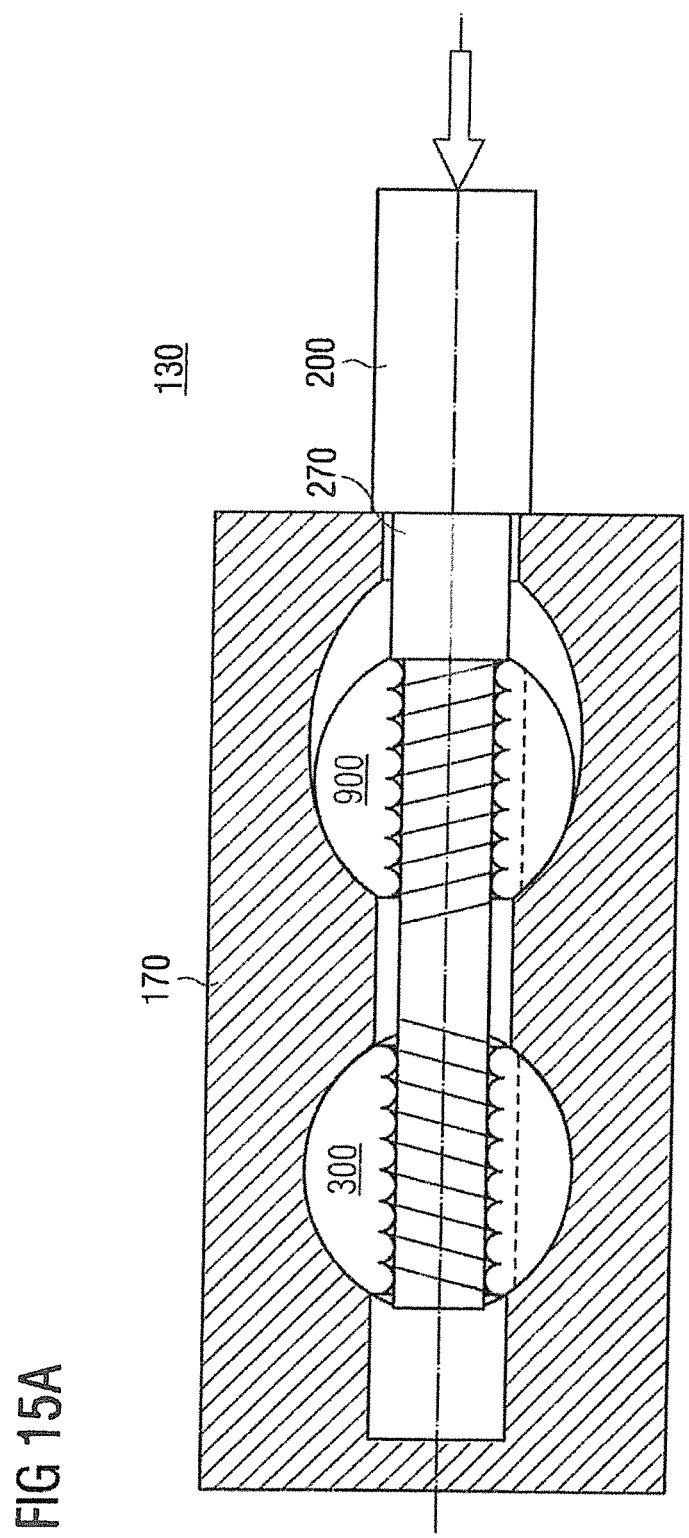
FIG. 15A shows a sectional view of the variant of FIG. 14 in a position of the first male fastener being inserted into the first and fourth female fastener.

The first male fastener 200 can be inserted into the first female fastener 300 and the fourth female fastener 900 in a state where the cross-sectional projection of the at least one ridged section 225 of the first male fastener 200 coincides with the cross-sectional projection of the at least one plain section 330 of the first female fastener 300 and with a cross-sectional projection of the at least one plain section 930 of the fourth female fastener 900. This position is illustrated in FIG. 15A.

The fourth female fastener 900 may be capable of moving in a longitudinal direction of its tubular part 910. For instance, the first and fourth female fasteners 300, 900 may be arranged in a structural element 170. While the first female fastener 300 is fixedly connected to the structural element 170, the fourth female fastener 900 may be capable of moving in the longitudinal direction of its tubular part 910. For example, the fourth female fastener 900 may be arranged in an elongated hole or slit within the structural element 170.

By inserting the first male fastener 200, the fourth female fastener 900 may be moved in the insertion direction. For example, the rubber bush 270 can be dimensioned and disposed on the bolt-shaped part 210, so that a distal end of the rubber bush 270 contacts the fourth female fastener 900 and moves the fourth female fastener 900 to a corresponding end of the elongated hole of the structural element 170 during insertion of the first male fastener 200.

Figure 15B:
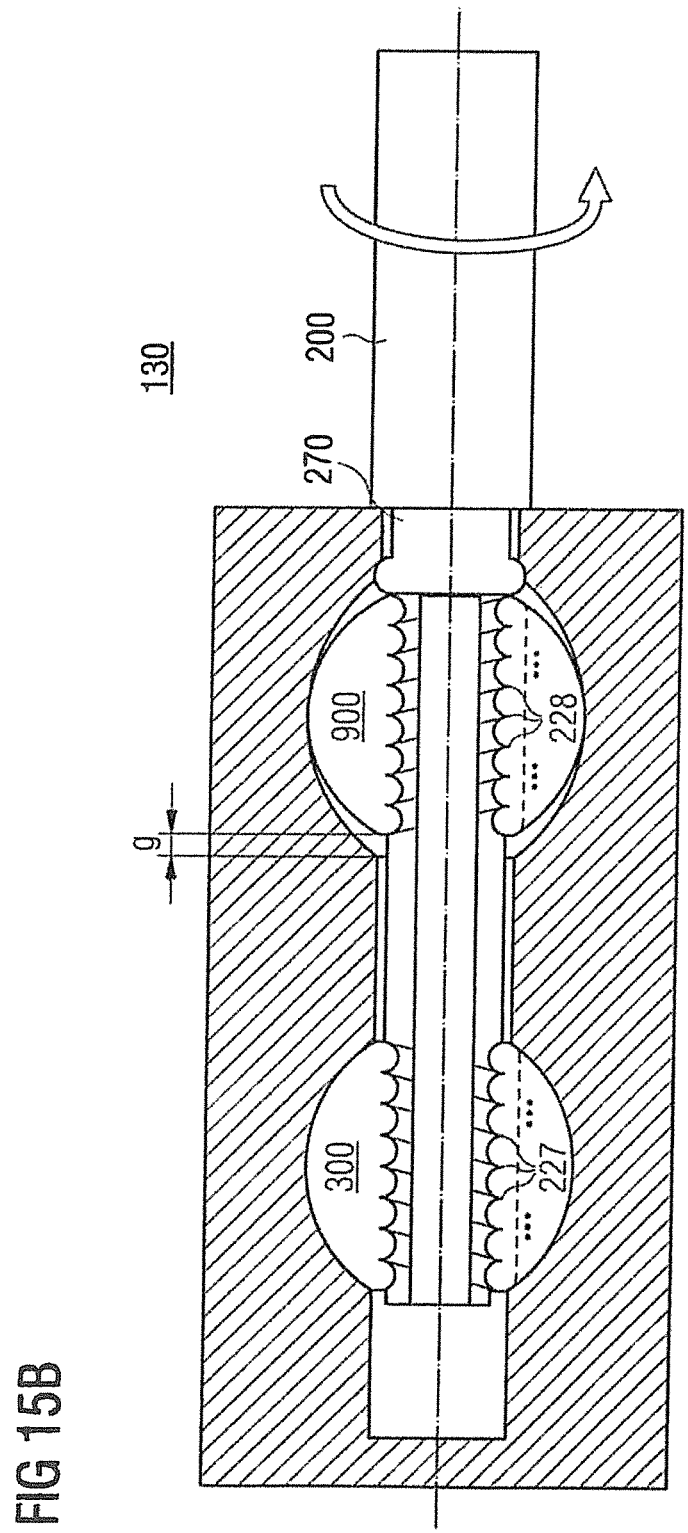
FIG. 15B shows a sectional view of the variant of FIG. 14 in a position of the first male fastener being inserted into the first and fourth female fastener and rotated relative to the first and fourth female fastener.

Furthermore, the first male fastener 200 can be rotated relative to the first and fourth female fasteners 300, 900, thereby engaging respective ridges 227 of the first area 260 of the first male fastener 200 and ridges 327 of the first female fastener 300 and engaging respective ridges 228 of the second area 265 of the first male fastener 200 and ridges 927 of the fourth female fastener 900. This rotation and engaging of ridges 227, 327, 228 and 927 is illustrated in FIG. 15B.

Due to the different pitch values of ridges 227 and 327 on the one hand and ridges 228 and 927 on the other hand, the rotation of first male fastener 200 can move the fourth female fastener 900 within the structural element 170. Thereby the fixation between the first and fourth female fasteners 300, 900 is possible, while at the same time a gap "G" between a distal end of the tubular part 910 of the fourth female fastener 900 with respect to the structural element 170 can be set.

When rotating the first male fastener 200, the rubber bush 270 can be compressed by the fourth female fastener 900. The space required for setting the gap "G" is available due to the compressibility of the rubber bush 270.

Thus, the fixation assembly 130 provides for a fixed connection between the first and fourth female fasteners 300, 900 in a fast manner. Due to opposing pitch values of ridges 227 and 327 as well as 228 and 927 the gap "G" can be set very easy. Furthermore, the gap "G" can be set in a wider range than compared to a fixation assembly with only one female fastener, such as in FIG. 2. In an exemplary implementation, at least one of the first female fastener 300 and the fourth female fastener 900 can be designed as a barrel nut.

The fixation assembly 130 illustrated in FIGS. 14 to 15B can be employed to connect a first object, such as structural element 170 to a second object (not shown) via fourth female fastener 900. In case the first and/or second object includes tolerances, the fixation assembly can be used to compensate these tolerances by setting the predefined gap "G".

In accordance with a further implementation, the fixation assembly 130 may be arranged in a structural element 170 having—in addition to the first elongated hole for receiving the fourth female fastener 900—a second elongated hole (not shown) for receiving the first female fastener 300. This allows setting the gap "G" at the fourth female fastener 900 as described above, while the fixation assembly 130 (first and fourth female fastener 300, 900 together with first male fastener 200) can move with respect to structural element 170. This movement of fixation assembly 130 allows, for example, compensation of further tolerances or a relative movement of the structural element 170 with respect to a second object coupled to the first and/or fourth female fastener 300, 900 after fixation, such as load-induced or thermal expansion movements. The dimensions of the second elongated hole may correspond to those of the first elongated hole or may be different.

The above described aspects, variants and implementations of a fixation assembly do not limit the present disclosure. Any details described with respect to one of the male and female fasteners may also be implemented or applied to another one of the described male and female fasteners, since the fasteners focus on the same connecting principle involving ridged sections and plain sections.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST

| | |
|---|---|
| 100 | fixation assembly |
| 110 | fixation assembly (connecting bush) |
| 120 | fixation assembly (3-axis compens.) |
| 130 | fixation assembly (barrel nuts) |
| 160 | countersink |
| 170 | structural element |
| 200 | first male fastener |
| 210 | bolt-shaped part |
| 220 | circumferential path |
| 225 | ridged section |
| 227 | ridge |
| 228 | ridge (opposite pitch) |
| 230 | plain section |
| 240 | recess |
| 250 | chamfered end |
| 260 | first area |
| 265 | second area |
| 270 | rubber bush |
| 300 | first female fastener |
| 310 | tubular part |
| 320 | circumferential path |
| 325 | ridged section |
| 327 | ridge |
| 330 | plain section |
| 340 | recess |
| 350 | circumferential path |
| 355 | ridged section |
| 357 | ridge |
| 360 | plain section |
| 370 | recess |
| 380 | countersunk head |
| 385 | chamfered end |
| 390 | longitudinal end attachment means |
| 400 | second female fastener |
| 410 | tubular part |
| 420 | circumferential path |
| 425 | ridged section |
| 427 | ridge |
| 430 | plain section |
| 440 | recess |
| 460 | countersink |
| 510 | locking element |
| 515 | locking pin |
| 610 | receiving area |
| 615 | bore |
| 617 | thread |
| 620 | circumferential path |
| 625 | ridged section |
| 627 | ridge |
| 630 | plain section |
| 640 | recess |
| 700 | second male fastener |
| 710 | bolt-shaped part |
| 720 | circumferential path |
| 725 | ridged section |
| 727 | ridge |
| 730 | plain section |
| 740 | recess |
| 800 | third female fastener |
| 810 | tubular part |
| 820 | circumferential path |
| 825 | ridged section |
| 827 | ridge |
| 830 | plain section |
| 840 | recess |
| 850 | circumferential path |
| 855 | ridged section |
| 857 | ridge |
| 860 | plain section |
| 870 | recess |
| 900 | fourth female fastener |
| 910 | tubular part |
| 920 | circumferential path |
| 925 | ridged section |
| 927 | ridge |
| 930 | plain section |
| 940 | recess |
| Δ | offset |
| G | gap |

The invention claimed is:

1. A fixation assembly for affixing a first object to and variably spaced from a second object, the fixation assembly comprising:

a first male fastener comprising a bolt-shaped part having a circumferential outer surface, wherein the circumferential outer surface includes alternately on a circumferential path in a cross-sectional plane of the bolt-shaped part at least one ridged section and at least one plain section, wherein each ridged section includes at least one ridge; and a first female fastener comprising a tubular part having a circumferential inner surface, wherein the circumferential inner surface includes alternately on a circumferential path in a cross-sectional plane of the tubular part at least one ridged section and at least one plain section, wherein each ridged section includes at least one ridge, wherein the first male fastener is configured to be inserted into the first female fastener in a state where a cross-sectional projection of the at least one ridged section of the first male fastener coincides with a cross-sectional projection of the at least one plain section of the first female fastener, wherein one of the first male fastener and the first female fastener is configured to be rotated relative to the other fastener, thereby engaging respective ridges of the first male fastener and the first female fastener, and a second female fastener comprising a tubular part having a circumferential inner surface, wherein the circumferential inner surface includes alternately on a circumferential path in a cross-sectional plane of the tubular part at least one ridged section and at least one plain section, wherein each ridged section includes at least one ridge, wherein the first female fastener is a connecting bush and the tubular part of the first female fastener has a circumferential outer surface, wherein the circumferential outer surface of the first female fastener includes alternately on the circumferential path in the cross-sectional plane of the tubular part at least one ridged section and at least one plain section, and wherein each ridged section includes at least one ridge, wherein the first female fastener is configured to be inserted into the second female fastener in a state where a cross-sectional projection of the at least one ridged section on the circumferential outer surface of the first female fastener coincides with a cross-sectional projection of the at least one plain section of the second female fastener, and wherein the first female fastener is configured to be rotated relative to the first male fastener and relative to the second female fastener, thereby engaging respective ridges of the circumferential outer surface of the first female fastener and ridges of the circumferential inner surface of the second female fastener and engaging respective ridges of the circumferential inner surface of the first female fastener and ridges of the circumferential outer surface of the first male fastener.

2. The fixation assembly according to claim 1, wherein the bolt-shaped part of the first male fastener includes at least two ridged sections on the circumferential path in the cross-sectional plane of the bolt-shaped part, wherein the at least one ridge of a first ridged section is located differently in a longitudinal direction of the bolt-shaped part than the at least one ridge of a second ridged section, and wherein the tubular part of the first female fastener includes one ridged section on the circumferential path in the cross-sectional plane of the tubular part.

3. The fixation assembly according to claim 1, wherein the tubular part of the first female fastener includes at least two ridged sections on the circumferential path in the cross-sectional plane of the tubular part, wherein the at least one ridge of a first ridged section is located differently in a longitudinal direction of the tubular part than the at least one ridge of a second ridged section, and wherein the bolt-shaped part of the first male fastener includes one ridged section on the circumferential path in the cross-sectional plane of the bolt-shaped part.

4. The fixation assembly according to claim 1, wherein the first female fastener comprises a countersunk head.

5. The fixation assembly according to claim 1, wherein the first female fastener comprises at least one longitudinal end of the tubular part attachment means configured to receive a tool for rotating the first female fastener.

6. The fixation assembly according to claim 1, wherein the first male fastener further comprises a bore in the bolt-shaped part substantially perpendicular to a longitudinal axis of the bolt-shaped part, the bore having a circumferential inner surface, and wherein the circumferential inner surface of the bore includes alternately on a circumferential path in a cross-sectional plane of the bore at least one ridged section and at least one plain section, wherein each ridged section includes at least one ridge.

7. The fixation assembly according to claim 6, further comprising:

a second male fastener comprising a bolt-shaped part having a circumferential outer surface, wherein the circumferential outer surface of the bolt-shaped part of the second male fastener includes alternately on a circumferential path in a cross-sectional plane of the bolt-shaped part of the second male fastener at least one ridged section and at least one plain section, wherein each ridged section includes at least one ridge, wherein the second male fastener is configured to be inserted into the bore of the first male fastener in a state where a cross-sectional projection of the at least one ridged section of the second male fastener coincides with a cross-sectional projection of the at least one plain section of the bore of the first male fastener, and wherein the second male fastener is configured to be rotated relative to the first male fastener, thereby engaging respective ridges of the second male fastener and the bore of the first male fastener.

8. The fixation assembly according to claim 7, further comprising:

a third female fastener coupled to the second male fastener and comprising a tubular part having a circumferential inner surface, wherein the circumferential inner surface of the third female fastener includes alternately on a circumferential path in a cross-sectional plane of the tubular part of the third female fastener at least one ridged section and at least one plain section, wherein each ridged section includes at least one ridge.

9. The fixation assembly according to claim 1, wherein the circumferential outer surface of the bolt-shaped part of the first male fastener includes in a longitudinal direction of the bolt-shaped part two areas each including alternately on the circumferential path in the cross-sectional plane of the bolt-shaped-part of the first male fastener at least one ridged section and at least one plain section, wherein each ridged section includes at least one ridge.

* * * * *